US011845610B2

(12) United States Patent
Lert, Jr. et al.

(10) Patent No.: US 11,845,610 B2
(45) Date of Patent: Dec. 19, 2023

(54) AUTOMATED DECANT SYSTEM

(71) Applicant: Walmart Apollo, LLC, Bentonville, AR (US)

(72) Inventors: John G. Lert, Jr., Wakefield, MA (US); William J. Fosnight, Windham, NH (US); Charles W. Su, Stratham, NH (US); Christopher Hofmeister, Hampstead, NH (US)

(73) Assignee: WALMART APOLLO, LLC, Bentonville, AR (US)

( * ) Notice: Subject to any disclaimer, the term of this patent is extended or adjusted under 35 U.S.C. 154(b) by 177 days.

(21) Appl. No.: 17/538,466

(22) Filed: Nov. 30, 2021

(65) Prior Publication Data

US 2022/0081213 A1 Mar. 17, 2022

Related U.S. Application Data

(63) Continuation of application No. 16/530,249, filed on Aug. 2, 2019, now Pat. No. 11,192,719.

(60) Provisional application No. 62/713,760, filed on Aug. 2, 2018.

(51) Int. Cl.
*G06F 7/00* (2006.01)
*B65G 1/137* (2006.01)
*G06Q 50/28* (2012.01)

(52) U.S. Cl.
CPC ........... *B65G 1/1373* (2013.01); *G06Q 50/28* (2013.01)

(58) Field of Classification Search
CPC ...... B65G 1/1373; B65G 65/00; B65G 61/00; G06Q 50/28; G06Q 10/00; B65B 21/00; B65B 69/00; B65B 69/0025

USPC .......... 700/213, 217, 223, 228, 230
See application file for complete search history.

(56) References Cited

U.S. PATENT DOCUMENTS

| | | | |
|---|---|---|---|
| 5,179,329 A | 1/1993 | Nishikawa et al. | |
| 5,386,677 A | 2/1995 | Kobuki et al. | |
| 5,472,309 A | 12/1995 | Bernard et al. | |
| 5,642,976 A | 7/1997 | Konstant | |
| 6,264,422 B1 | 7/2001 | Hennes et al. | |
| 6,289,260 B1 * | 9/2001 | Bradley | B65G 1/1376 414/280 |
| 7,591,630 B2 | 9/2009 | Lert, Jr. | |
| 7,861,844 B2 | 1/2011 | Hayduchok et al. | |
| 7,894,932 B2 | 2/2011 | Mountz et al. | |
| 7,894,933 B2 | 2/2011 | Mountz et al. | |

(Continued)

FOREIGN PATENT DOCUMENTS

| | | |
|---|---|---|
| AU | 549775 | 2/1986 |
| DE | 4022120 | 1/1992 |

(Continued)

OTHER PUBLICATIONS

Response to Office Action, with English translation of claims as amended therein, dated Aug. 9, 2022, in Japanese Patent Application No. 2021-505823.

(Continued)

*Primary Examiner* — Yolanda R Cumbess
(74) *Attorney, Agent, or Firm* — Fitch, Even, Tabin & Flannery, LLP

(57) ABSTRACT

An automated decant system is disclosed for processing pallets of cased goods received at a facility, extracting packaging for the cases and transferring eaches within the cases to totes, possibly organized by SKU in sub-totes within the tote.

30 Claims, 23 Drawing Sheets

(56) References Cited

U.S. PATENT DOCUMENTS

| | | |
|---|---|---|
| 7,991,505 B2 | 8/2011 | Lert, Jr. et al. |
| 8,104,601 B2 | 1/2012 | Hayduchok et al. |
| 8,276,740 B2 | 10/2012 | Hayduchok et al. |
| 8,311,902 B2 | 11/2012 | Mountz et al. |
| 8,425,173 B2 | 4/2013 | Lert et al. |
| 8,447,665 B1 | 5/2013 | Schoenharl et al. |
| 8,483,869 B2 | 7/2013 | Wurman et al. |
| 8,527,325 B1 | 9/2013 | Atreya et al. |
| 8,594,835 B2 | 11/2013 | Lert |
| 8,622,194 B2 | 1/2014 | DeWitt et al. |
| 8,626,335 B2 | 1/2014 | Wurman et al. |
| 8,694,152 B2 | 4/2014 | Cyrulik et al. |
| 8,718,814 B1 | 5/2014 | Clark et al. |
| 8,740,538 B2 | 6/2014 | Lert et al. |
| 8,831,984 B2 | 9/2014 | Hoffman et al. |
| 8,892,240 B1 | 11/2014 | Vliet et al. |
| 8,965,562 B1 | 2/2015 | Wurman et al. |
| 8,972,045 B1 | 3/2015 | Mountz et al. |
| 8,983,647 B1 | 3/2015 | Dwarakanath et al. |
| 9,008,828 B2 | 4/2015 | Worsley |
| 9,008,829 B2 | 4/2015 | Worsley |
| 9,008,830 B2 | 4/2015 | Worsley |
| 9,020,632 B2 | 4/2015 | Naylor |
| 9,037,286 B2 | 5/2015 | Lert |
| 9,051,120 B2 | 6/2015 | Lert et al. |
| 9,096,375 B2 | 8/2015 | Lert et al. |
| 9,111,251 B1 | 8/2015 | Brazeau |
| 9,129,250 B1 | 9/2015 | Sestini et al. |
| 9,139,363 B2 | 9/2015 | Lert |
| 9,242,798 B2 | 1/2016 | Guan |
| 9,260,245 B2 | 2/2016 | Este et al. |
| 9,321,591 B2 | 4/2016 | Lert et al. |
| 9,330,373 B2 | 5/2016 | Mountz et al. |
| 9,334,113 B2 | 5/2016 | Naylor |
| 9,334,116 B2 | 5/2016 | DeWitt et al. |
| 9,378,482 B1 | 6/2016 | Pikler et al. |
| 9,423,796 B2 | 8/2016 | Sullivan et al. |
| 9,428,295 B2 | 8/2016 | Vliet et al. |
| 9,826,213 B1* | 11/2017 | Russell .................. B65G 69/00 |
| 9,908,696 B1* | 3/2018 | Zevenbergen ....... G06Q 10/087 |
| 10,793,355 B1 | 10/2020 | Garcia et al. |
| 2005/0047895 A1 | 3/2005 | Lert |
| 2006/0080819 A1* | 4/2006 | McAllister ............ G06K 17/00 |
| | | 29/403.3 |
| 2006/0257236 A1 | 11/2006 | Stingel, III et al. |
| 2007/0127691 A1 | 6/2007 | Lert, Jr. |
| 2010/0076591 A1 | 3/2010 | Lert, Jr. |
| 2010/0146907 A1 | 6/2010 | Fritzsche et al. |
| 2010/0316468 A1 | 12/2010 | Lert et al. |
| 2010/0316469 A1 | 12/2010 | Lert et al. |
| 2010/0316470 A1 | 12/2010 | Lert et al. |
| 2010/0322746 A1 | 12/2010 | Lert |
| 2010/0322747 A1 | 12/2010 | Lert et al. |
| 2011/0076128 A1 | 3/2011 | Johnsen et al. |
| 2012/0101627 A1 | 4/2012 | Lert |
| 2012/0186942 A1 | 7/2012 | Toebes et al. |
| 2012/0195720 A1 | 8/2012 | Sullivan et al. |
| 2013/0246229 A1 | 9/2013 | Mountz et al. |
| 2014/0088758 A1 | 3/2014 | Lert et al. |
| 2014/0212249 A1 | 7/2014 | Kawano |
| 2014/0271063 A1 | 9/2014 | Lert et al. |
| 2014/0288696 A1 | 9/2014 | Lert |
| 2014/0308098 A1 | 10/2014 | Lert et al. |
| 2015/0266672 A1 | 9/2015 | Lert et al. |
| 2015/0286967 A1 | 10/2015 | Lert et al. |
| 2015/0375938 A9 | 12/2015 | Lert et al. |
| 2016/0016733 A1 | 1/2016 | Lert |
| 2016/0075512 A1 | 3/2016 | Lert |
| 2016/0140488 A1* | 5/2016 | Lindbo ................. G06Q 10/087 |
| | | 705/28 |
| 2017/0043953 A1 | 2/2017 | Battles et al. |
| 2017/0158430 A1 | 6/2017 | Raizer |
| 2017/0225812 A1 | 8/2017 | Johnsen et al. |
| 2017/0267452 A1 | 9/2017 | Goren et al. |
| 2017/0297820 A1 | 10/2017 | Grinnell et al. |
| 2017/0313514 A1 | 11/2017 | Lert, Jr. et al. |
| 2017/0330142 A1 | 11/2017 | Kanellos et al. |
| 2018/0029797 A1 | 2/2018 | Hance et al. |
| 2018/0141754 A1 | 5/2018 | Garrett et al. |
| 2019/0152634 A1 | 5/2019 | Almogy et al. |
| 2020/0306973 A1 | 10/2020 | Edwards et al. |

FOREIGN PATENT DOCUMENTS

| | | |
|---|---|---|
| DE | 4329180 | 3/1995 |
| EP | 0404272 | 12/1990 |
| EP | 0839108 | 7/1995 |
| EP | 2650237 | 11/2014 |
| EP | 2651786 | 5/2016 |
| EP | 2651787 | 5/2016 |
| FR | 2464222 | 3/1981 |
| JP | H0285125 | 3/1990 |
| JP | 2002080007 | 3/2002 |
| WO | 2005097550 | 10/2005 |
| WO | 2010125111 | 11/2010 |
| WO | 2016172793 | 11/2016 |
| WO | 2016199033 | 12/2016 |
| WO | 2017064401 | 4/2017 |

OTHER PUBLICATIONS

Office Action dated Feb. 9, 2022 in Japanese Patent Application No. 2021-505823.
Office Action dated Oct. 24, 2022, in Japanese Patent Application No. 2021-505823.
Invitation to Pay Additional Fees and Partial International Search Results in International Patent Application No. PCT/US2022/018802.
English language Abstract for FR2464222 published Mar. 6, 1981.
English language Abstract for WO2017064401 published Apr. 20, 2017.
English language Abstract for JPH0285125 published Mar. 23, 1990.
English language Abstract for DE4329180 published Mar. 2, 1995.
International Search Report and Written Opinion dated Nov. 28, 2019 in International Patent Application No. PCT/US2019/044934.
Response to Office Action dated Sep. 17, 2021 in European Patent Application No. 19762251.7.
Notice of Allowance and Fee(s) Due dated Jul. 28, 2021 in U.S. Appl. No. 16/530,249.
Amendment Under 37 C.F.R. 1.312 dated Oct. 14, 2021 in U.S. Appl. No. 16/530,249.
Notice of Allowability dated Oct. 27, 2021 in U.S. Appl. No. 16/530,249.
International Search Report and Written Opinion dated Oct. 7, 2022 in International Patent Application No. PCT/US2022/018802.
English language Abstract for DE4022120 published Jan. 16, 1992.
Notice of Appeal, Appeal Brief and Amendment dated Feb. 28, 2023, with English translation of claims as amended, in Japanese Patent Application No. 2021-505823.

* cited by examiner

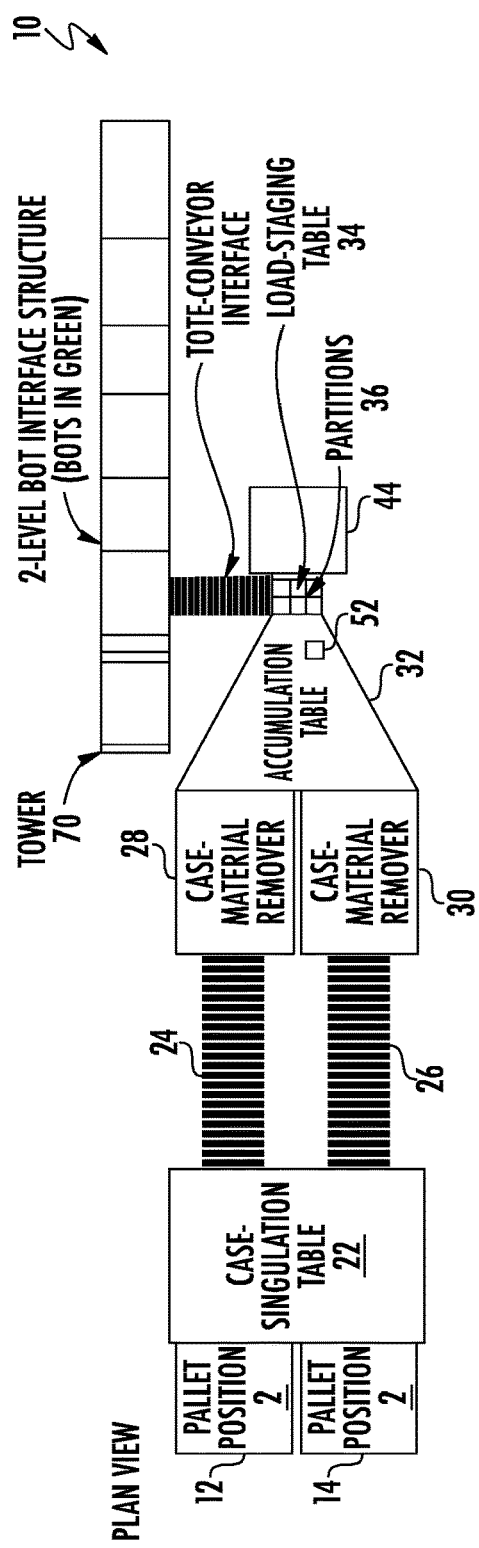
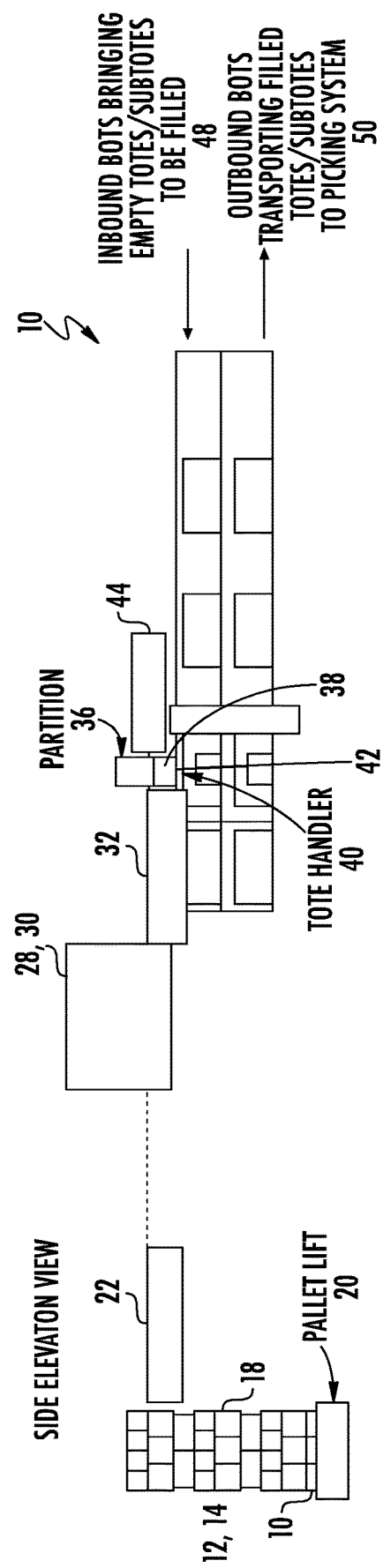

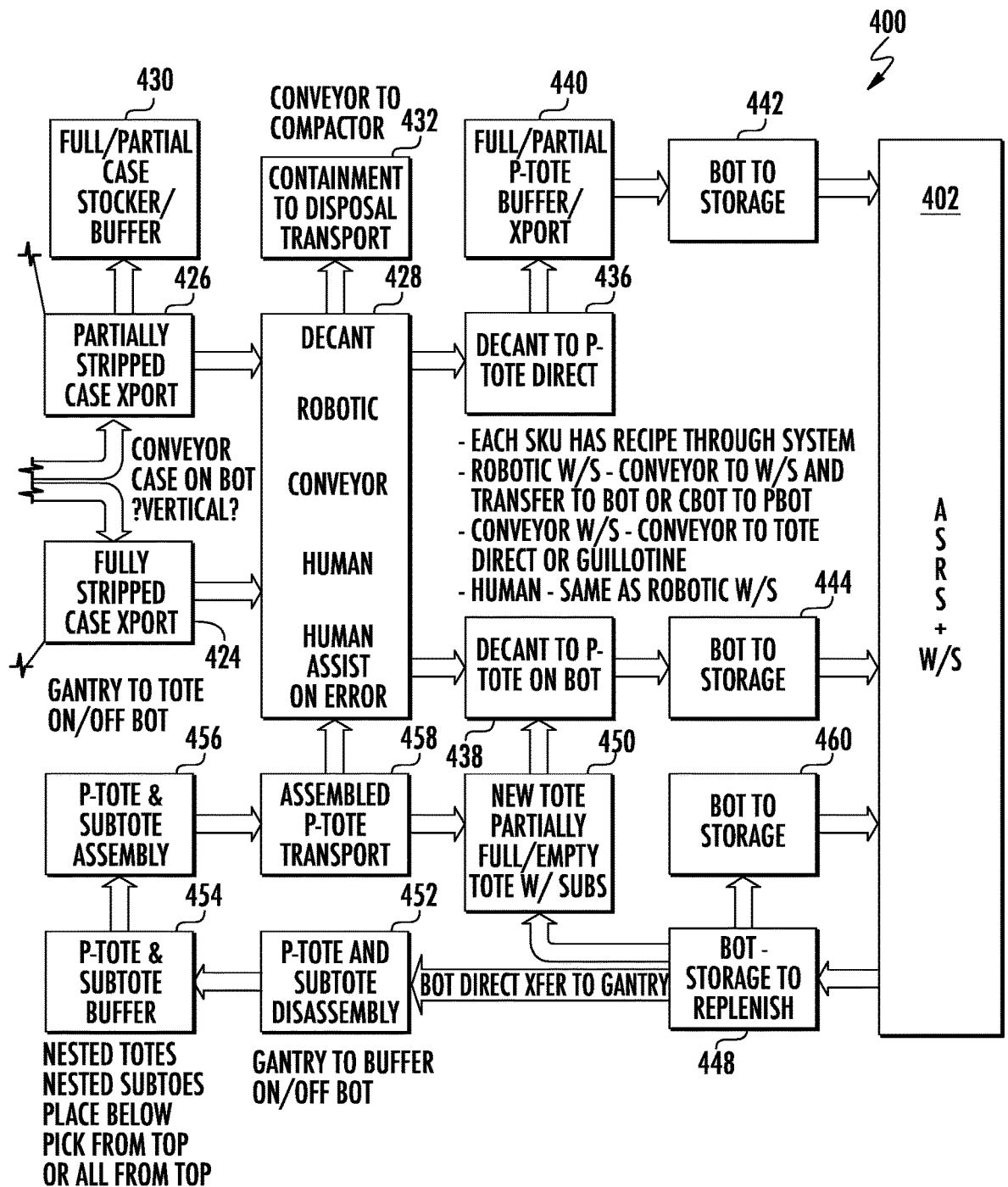
FIG. 7 CONTINUES

AUTOMATED DECANT SYSTEM

PRIORITY CLAIM

This application is a continuation of U.S. patent application Ser. No. 16/530,249 filed on Aug. 2, 2019 entitled "Automated Decant System", to be issued as U.S. Pat. No. 11,192,719, which application claims priority to U.S. Provisional Patent Application No. 62/713,760 filed on Aug. 2, 2018 entitled "Automated Decant System", which applications are incorporated by reference herein in their entirety.

FIELD OF THE INVENTION

The exemplary and non-limiting embodiments described herein relate generally to an automated retail supply chain storage and retrieval system, and more particularly to an automated system for decanting incoming cases or pallets of eaches into totes and sub-totes in accordance with an illustrative embodiment.

BACKGROUND

In conventional retail stores, the most cost-efficient method of replenishing store inventories is by delivering inventory from supplying manufacturers to the retail stores by the case. In a conventional distribution model, the retailer receives pallets of cases including inventory, which inventory is also referred to as "eaches." Conventionally, received eaches are stripped of their packaging, organized by Stock Keeping Unit or "SKU," and then transferred to storage containers for storage until needed. At least some of these steps have traditionally been performed manually.

SUMMARY

Embodiments of the present technology relate to an automated decant system for use in supply chains, for example in retail supply chains. The embodiment is disclosed for automated decant of cases of eaches into totes where the cases are comprised of products received from manufacturers or for fulfilling orders for discreet product units contained in such cases In one example, the present technology relates to an automated decant system for transferring eaches received at a facility into a tote, the automated decant system comprising: a load-staging table configured to receive eaches, the load-staging table comprising a movable support surface configured to support eaches at the load-staging table; one or more dividers for organizing the eaches into one or more sets of eaches in predefined positions on the load-staging table; an actuator configured to withdraw the movable support surface from beneath the eaches at the load-staging table; and a mobile robot configured to support the tote as the mobile robot moves around the facility; wherein the actuator is configured to withdraw the movable support when the tote is positioned beneath the load-staging table to drop the one or more sets of eaches into the tote on, the mobile robot thereafter transferring the one or more sets of eaches in the tote away from the load-staging table.

In the preceding example, the eaches are received at the facility packaged in cases on pallets, and the automated decant system further comprises a robotic case de-palletizer module configured to convert pallets of packaged cases to individual, unwrapped cases.

In any of the preceding examples, the robotic case de-palletizer module is configured to remove shrink wrap around the cases, isolate for transport multiple layers of cases having same SKU eaches, and/or isolate for transport a single case having the same SKU eaches.

In any of the preceding examples, the eaches are received at the facility packaged in cases, and the automated decant system further comprises a case stripping machine configured to remove the case packaging materials from each case.

In any of the preceding examples, the mobile robot is one of a pair of mobile robots comprising totes for receiving eaches, the automated decant system working with the pair of mobile robots simultaneously such that a first mobile robot of the pair positions a tote beneath the load-staging table to receive eaches as a second mobile robot of the pair withdraws a tote from beneath the load-staging table having just received eaches.

In any of the preceding examples, the mobile robot is one of a plurality of mobile robots, the automated decant system comprising a pair of lanes below, and to either side of, the load-staging table, wherein a first mobile robot of the plurality of mobile robots in the first lane extends an empty tote inward under the load-staging table to receive eaches as a second mobile robot of the plurality of mobile robots in the second lane withdraws a tote having just received eaches from under the load-staging table.

In any of the preceding examples, the movable support surface is configured to slide laterally or rotate about an axis downward from beneath the eaches at the load-staging table, at which point the eaches drop into the tote.

In any of the preceding examples, the one or more dividers maintain the eaches in the one or more sets as the eaches drop into the tote.

In any of the preceding examples, the movable support surface comprises first and second conveyor belts, the first belt supported on a first drive roller and a first driven roller, both configured for rotation and translation, and the second conveyor belt supported on a second drive roller and a second driven roller, both configured for rotation and translation, the first and second driven rollers positioned adjacent to each other for the first and second conveyors to support the eaches at the load-staging table.

In any of the preceding examples, translation of at least one of the first and second drive rollers creates a gap between the first and second driven rollers through which gap the eaches drop into the tote.

In any of the preceding examples, the tote comprises first and second sub-totes, and wherein the eaches fall into the first sub-tote when the gap is created over the first sub-tote, and wherein the eaches fall into the second sub-tote when the gap is created over the second sub-tote.

In any of the preceding examples, the tote comprises one or more sub-totes, the one or more dividers defining positions of the one or more sets of eaches corresponding to positions of the one or more sub-totes in the tote.

In a further example, the present technology relates to an automated decant system for transferring eaches received at a facility into totes, the automated decant system comprising: a load-staging table configured to receive eaches, the load-staging table comprising a movable support surface configured to support eaches at the load-staging table; and a plurality of mobile robots configured to support the totes as the mobile robots move around the facility, the plurality of mobile robots comprising: inbound mobile robots which position totes beneath the load-staging table to receive eaches upon withdrawal of the movable support surface, and outbound mobile robots which transfer totes from beneath the load-staging table away from the load staging table after having received eaches upon withdrawal of the movable support surface.

In the preceding example, the eaches are received at the facility packaged in cases on pallets, and the automated decant system further comprises a robotic case de-palletizer module configured to convert pallets of packaged cases to individual, unwrapped cases.

In any of the preceding examples, the robotic case de-palletizer module is configured to remove shrink wrap around the cases, isolate for transport multiple layers of cases having same SKU eaches, and/or isolate for transport a single case having the same SKU eaches.

In any of the preceding examples, the eaches are received at the facility packaged in cases, and the automated decant system further comprises a case stripping machine configured to remove the case packaging materials from each case.

In any of the preceding examples, the automated decant system works with the pair of mobile robots simultaneously such that a first mobile robot of the pair positions a tote beneath the load-staging table to receive eaches as a second mobile robot of the pair withdraws a tote from beneath the load-staging table having just received eaches.

In any of the preceding examples, the automated decant system comprises a pair of lanes below, and to either side of, the load-staging table, wherein a first mobile robot of the plurality of mobile robots in the first lane extends an empty tote inward under the load-staging table to receive eaches as a second mobile robot of the plurality of mobile robots in the second lane withdraws a tote having just received eaches from under the load-staging table.

In any of the preceding examples, the movable support surface is configured to slide laterally or rotate about an axis downward from beneath the eaches at the load-staging table, at which point the eaches drop into one of the totes.

In any of the preceding examples, the movable support surface comprises first and second conveyor belts, the first belt supported on a first drive roller and a first driven roller, both configured for rotation and translation, and the second conveyor belt supported on a second drive roller and a second driven roller, both configured for rotation and translation, the first and second driven rollers positioned adjacent to each other for the first and second conveyors to support the eaches at the load-staging table.

In any of the preceding examples, translation of at least one of the first and second drive rollers creates a gap between the first and second driven rollers through which gap the eaches drop into the tote.

In any of the preceding examples, one or more dividers are provided configured to separate the eaches into one or more sets of eaches on the load-staging table.

In any of the preceding examples, a tote comprises one or more sub-totes, the one or more dividers defining positions of the one or more sets of eaches corresponding to positions of the one or more sub-totes in the tote.

In a further example, the present technology relates to an automated decant system for transferring eaches, received at a facility packaged in cases on pallets, into totes, the automated decant system comprising: a control system including a processor configured to: receive an identifier associated with the cases and/or eaches; match the identifier with a stored software recipe customized for the identifier; execute the software recipe, identified for the cases and/or eaches, directing the handling of the identified cases and/or eaches; a robotic case de-palletizer module, in communication with the control system, configured to convert pallets of packaged cases to individual, unwrapped cases per the executed software recipe; an automated case stripping machine, in communication with the control system, configured to remove at least some of the case packaging materials from each case per the executed software recipe; and a loading work cell receiving the case per an instruction from the software recipe, the eaches transferred from the case to a tote at the loading work cell per the executed software recipe.

In the preceding example, a mobile robot is provided, configured to: support the tote; maneuver to loading work cell to position the tote to receive the eaches once separated from the case; and maneuver away from the loading work cell once the eaches are received in the tote.

In any of the preceding examples, the loading work cell comprises a robotic system for transferring the eaches from the case to the tote per the software recipe.

In any of the preceding examples, the robotic system comprises a machine vision device and a gripper for transferring eaches to the tote organized by SKU.

In any of the preceding examples, the loading work cell comprises a display for displaying instructions from the software recipe for manual transfer of the eaches from the case to the tote.

In any of the preceding examples, the software recipe directs the packaging materials to be fully removed at the automated case stripping machine, and the software recipe directs the loading work cell to separate the eaches from the fully stripped cases.

In any of the preceding examples, the software recipe directs the packaging materials to be partially removed at the automated case stripping machine, and the software recipe directs the loading work cell to separate the eaches from the partially stripped cases.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

The foregoing aspects and other features are explained in the following description, taken in connection with the accompanying drawings, wherein:

FIGS. 1A and 1B are plan and side elevation views of an automated decant workstation according to embodiments of the present technology;

DETAILED DESCRIPTION

Figure 2A:
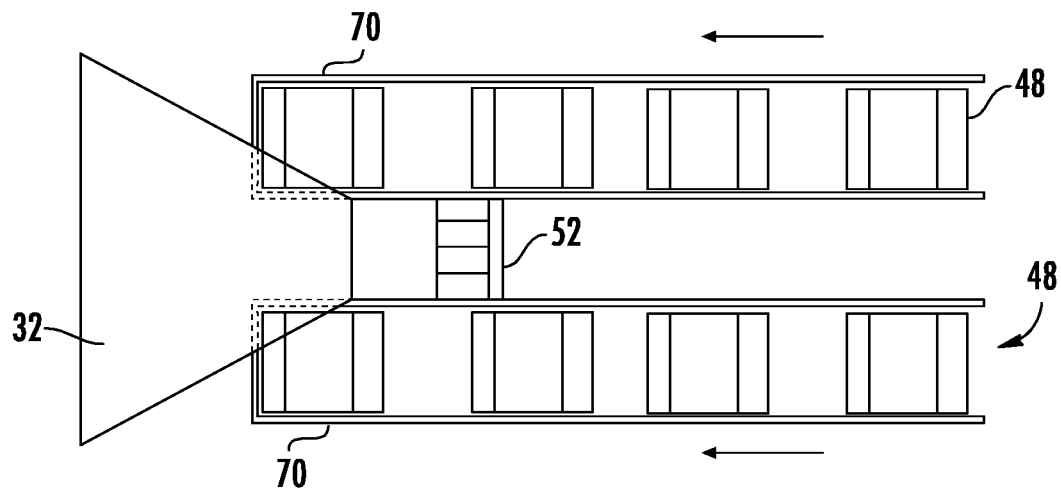
FIGS. 2A-2D are plan views of an automated decant system for transferring eaches from a mobile robot to a tote according to embodiments of the present technology.

The disclosed embodiment may be described as an automated decant system for use in supply chains, for example in retail supply chains. The embodiment is disclosed for automated decant of cases of eaches into totes where the cases are comprised of products received from manufacturers or for fulfilling orders for discreet product units contained in such cases, referred to herein as "eaches" (other commonly used synonyms include "pieces", "articles", "items"), or generally any articles ordered by stores or individual consumers in less-than-case quantities. While the embodiment can be used in other applications, such as storage and retrieval of parts and work-in-process within manufacturing operations, one field of use is order-fulfillment in retail supply chains.

Referring to FIG. 1A, there is shown a plan view of an automated decant workstation 10. Referring also to FIG. 1B, there is shown a side elevation view of automated decant workstation 10. There are two positions 12, 14 where pallets 16 of cases 18 to be decanted are positioned for processing. Only one pallet may be processed at a time, which allows an empty pallet to be replaced with a full pallet while the second pallet is being processed. Pallets supply layers of cases 18 to be processed by the workstation, one SKU at a time; cases of multiple layers can be combined for processing, for example if they are the same SKU, and loading of all of the eaches from a given SKU may be completed before any eaches from a different SKU are loaded.

Pallet Lift 20 may be provided to elevate the input pallet so that the top layer of cases can be transferred onto Case-Singulation Table 22 to be processed. The singulation table feeds cases in single-file onto two conveyors 24, 26, each of which feed cases into case stripping machine 28, 30 that removes the case packaging materials from each case. Once the packaging materials have been removed, the contained eaches can then be manipulated in groups and bulk-loaded into totes and subtotes. First, the eaches move onto Accumulation Table 32, which accumulates eaches 52 of the same SKU from multiple cases. At the opposite end of the accumulation table, sets of eaches are moved one at a time onto a Load-Staging table 34. There they are separated into subtote groupings by a Load Organizer using Divider/Manipulators 36 that mirror the configuration of subtote walls. Dividers 36 may include multiple dividers that are selectively movable and positionable from the sides of the accumulated eaches where some may be moveable vertically and horizontally on a gantry from above to selectably form any suitable pattern of dividers to match the walls of the tote and/or subtotes that the eaches are to be deposited or loaded into.

Figure 3A:
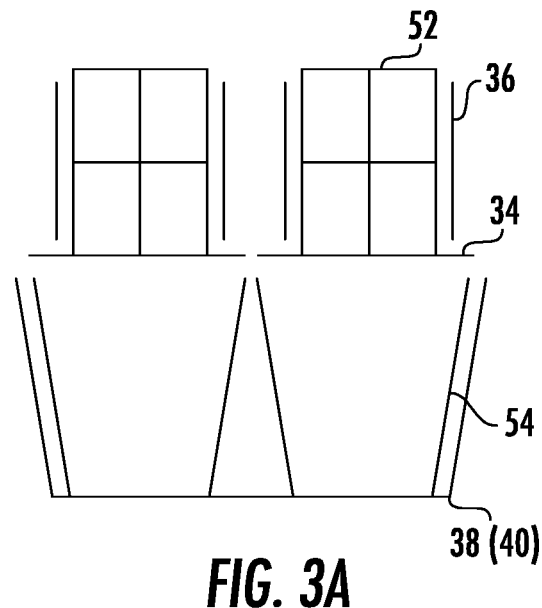
FIGS. 3A-3F are side elevation views of an automated decant system for transferring eaches from a load staging surface to a tote according to embodiments of the present technology.
Figure 3B:
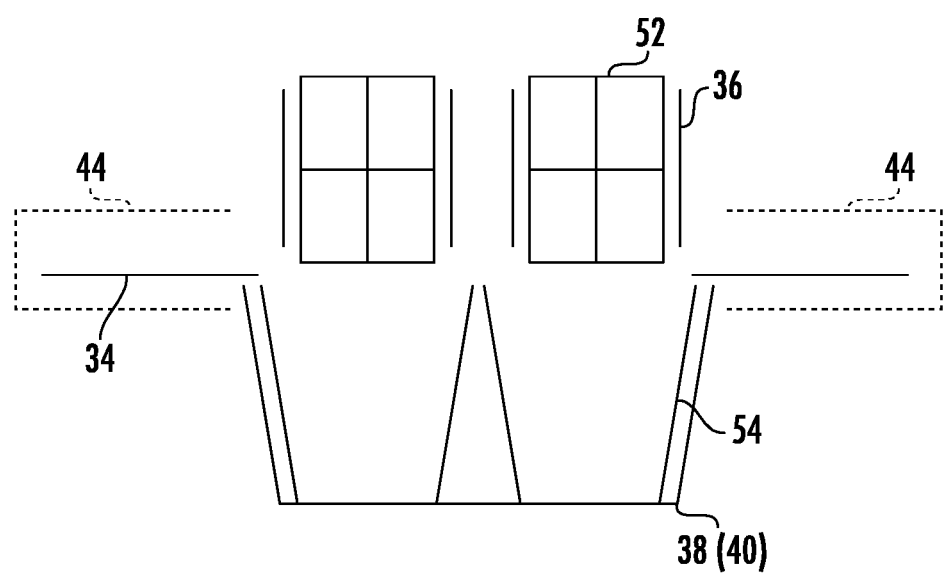
Figure 3C:
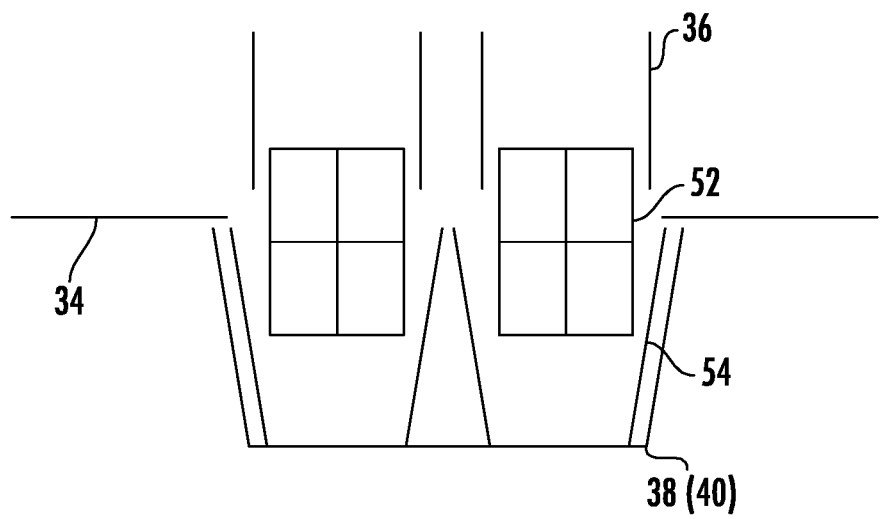
Figure 3D:
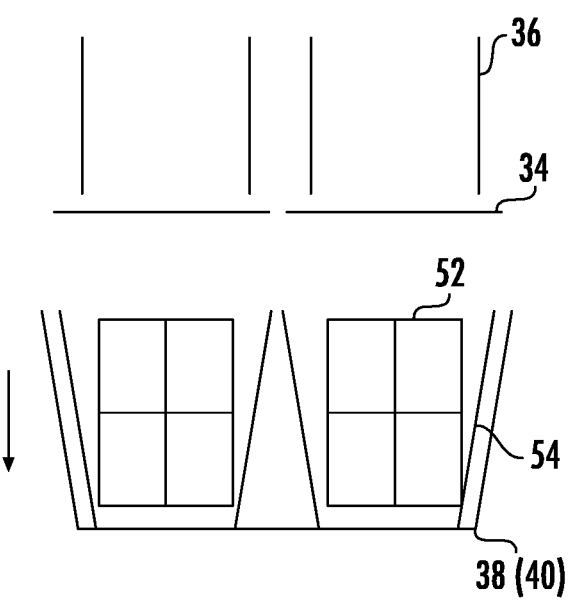
Figure 3E:
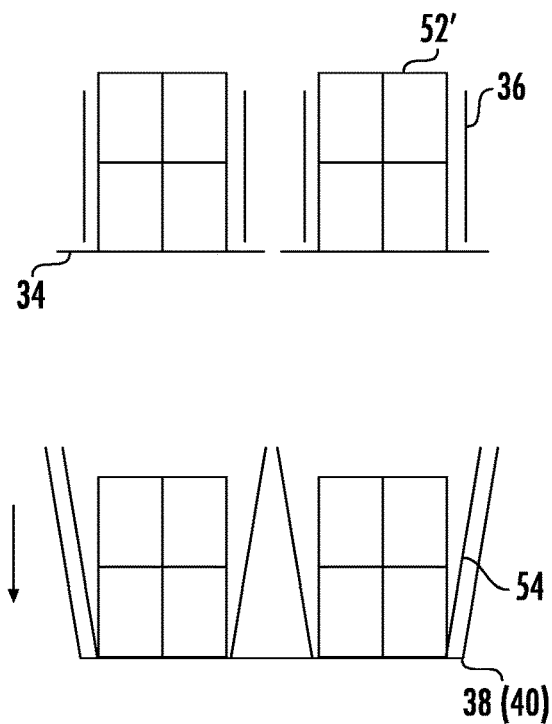

Referring also to FIGS. 3A-3F, directly under the load-staging table is the tote to be loaded 38, supported by a Tote Handler 40 and precisely aligned with the load of eaches, i.e. the subtotes 54 are positioned precisely below the subtote groupings of eaches. Tote handler 40 may be any suitable vertical indexer where position and velocity can be suitably controlled. Tote handler 40 may also positively grasp the tote in the event it needs to exceed >1 g or otherwise. Once the load of eaches is organized properly, the surface 42 of the staging table 34 abruptly disappears very rapidly (far faster than 1 g), while also retracting completely into an adjacent housing 44 as seen in FIG. 3B. Here staging table may be a single table or split as shown. Further staging table 34 may be simply laterally moved very quickly, moved rapidly at a downward angle, or alternately be lowered and then or simultaneously be laterally moved out of the way. Alternately staging table 34 may be hinged horizontally or vertically or otherwise moved out of the way of the dropping eaches. Alternately a multi piece iris may be used. In the event the staging table is moved vertically or otherwise, it may further be perforated to prevent suction from the rapid separation from the eaches. Staging table 34 may be moved by actuators including pneumatic, electric or any suitable actuation. With nothing but air underneath them, the eaches previously supported by the load-staging table now begin to drop at a rate of 1 g as seen in FIG. 3C. As soon as the falling eaches have cleared the plane of the load-staging table, the support surface of that table returns to load position as seen in FIG. 3D, and the next load of eaches 52' begins to be organized immediately as seen in FIG. 3E.

Figure 3F:
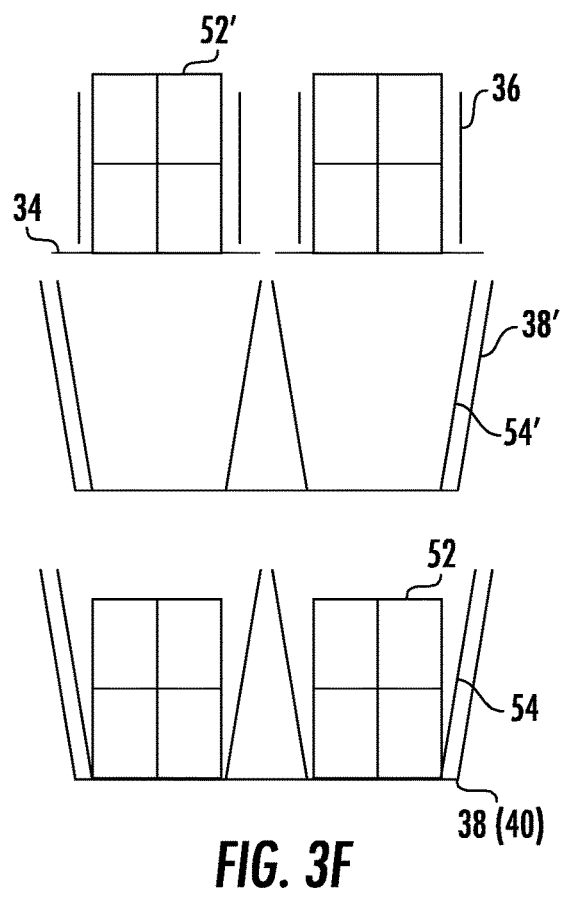

Because walls of the subtotes are aligned precisely with the Divider/Manipulators 36, the falling eaches can only drop straight into the subtotes. As the bottom surfaces of the eaches approach the bottoms of the subtotes, the tote-handler 40 begins dropping the tote, almost-but-not-quite matching the velocity of the dropping eaches. Because there is only a slight difference in speed between the tote and the eaches, the force of impact is only very slight when the bottoms of the eaches encounter the bottoms of the subtotes as seen in FIG. 3E. At that point, the tote decelerates to a gentle stop as seen in FIG. 3F. The result of this sequence is that the tote "catches" the falling eaches very softly, with minimal jostling and collision of the eaches.

The tote-handler 40 brings the tote to a stop between and aligned with the Inbound 48 and Outbound 50 Tote Conveyors (for example, inbound and outbound mobile robots), with transfer mechanisms interfacing those conveyors with the tote handler. If the tote is to receive another layer of eaches in a second load, it would return to the receiving position just under the staging table, and the process would be repeated. Otherwise, the filled tote is transferred onto the outbound conveyor, and an empty tote is transferred onto the tote handler, which returns to the receive position to be loaded. Because the organization of a next load of eaches overlaps in time with the drop-loading of the previous set of eaches, the load cycle can be initiated as soon as the receiving tote 38' is in load position.

Figure 2B:
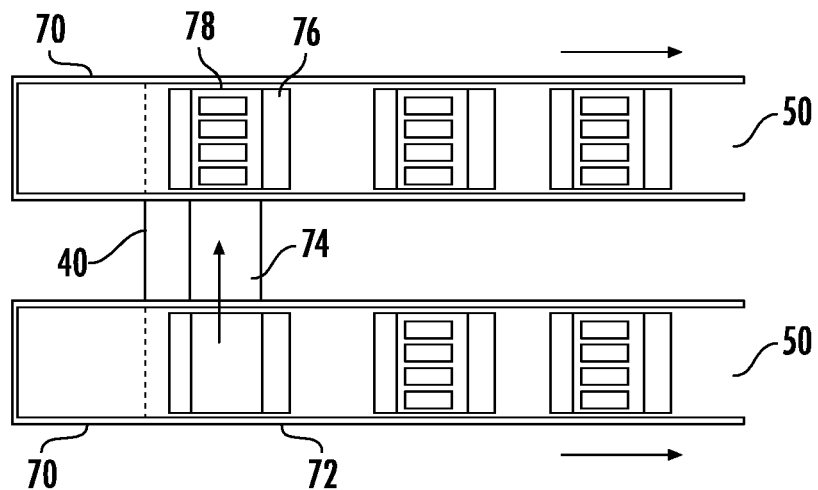
Figure 2C:
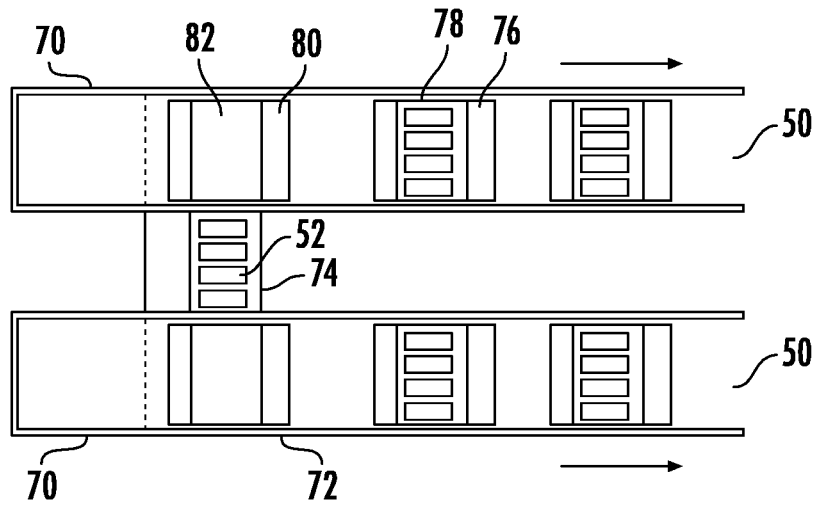
Figure 2D:
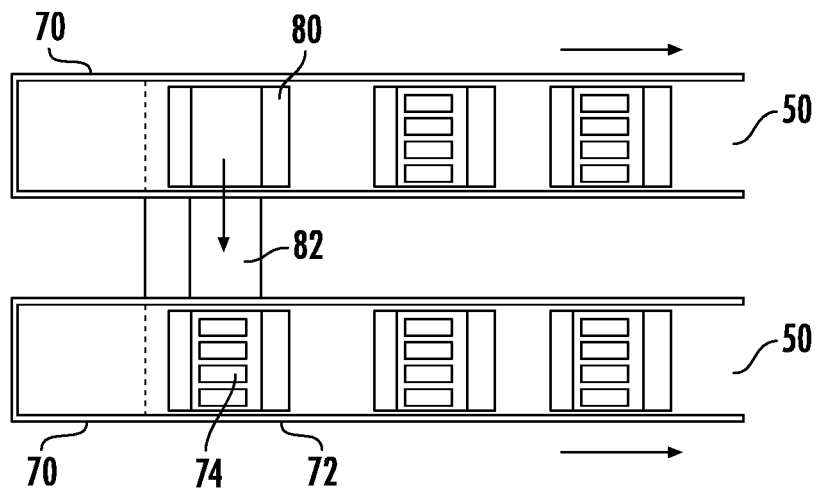

Referring to FIGS. 2A-2D, there is shown an alternate bot to tote handler interface. In FIG. 2A, a partial plan view is shown with inbound bots are shown with empty totes to be filled on an upper level. Here the inbound bots travel to tower 70 to descend to the lower level to deposit empty totes onto the tote handler supporting surface 40. In FIGS. 2B-2D there is also shown a partial plan view with the upper inbound level removed for clarity. In FIG. 2B bot 72 transfers a tote 74 to be loaded onto tote handler 40 substantially simultaneously as Bot 76 removes loaded tote 78 from tote handler 40. In FIG. 2C tote handler 40 ascends to get a batch of eaches 52 as previously described and descends with loaded tote 74 while bot 80 with empty tote 82 arrives. In FIG. 2D bot 80 transfers a tote 82 to be loaded onto tote handler 40 substantially simultaneously as Bot 72 removes loaded tote 74 from tote handler 40. Tote loader then loads eaches into Tote 82 while another bot arrives with an empty tote in the position that departing bot 72 held and the sequence repeats to achieve maximum utilization of the equipment.

Figure 4A:
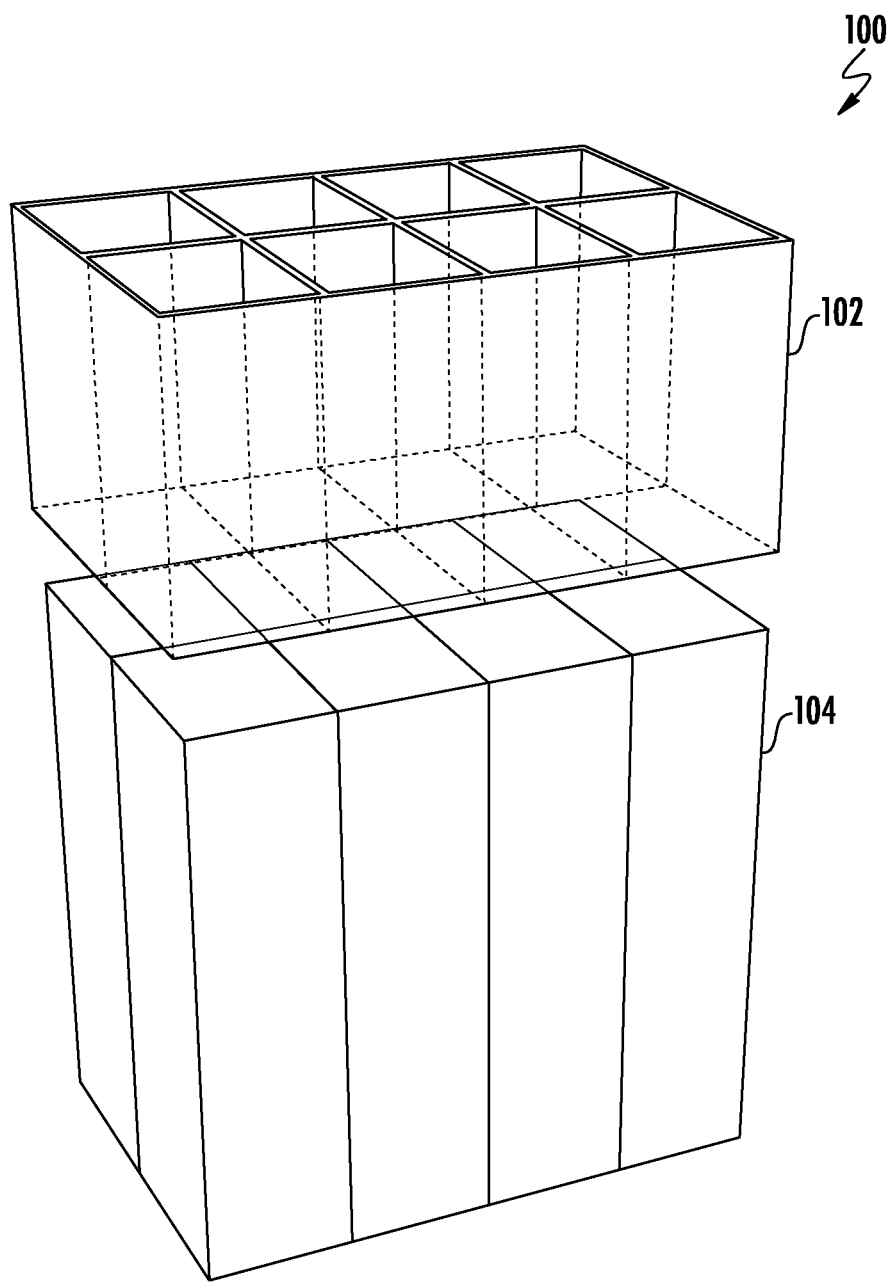
FIGS. 4A-4D are perspective views of an automated decant system for transferring eaches from a load staging surface to a tote according to further embodiments of the present technology.
Figure 4B:
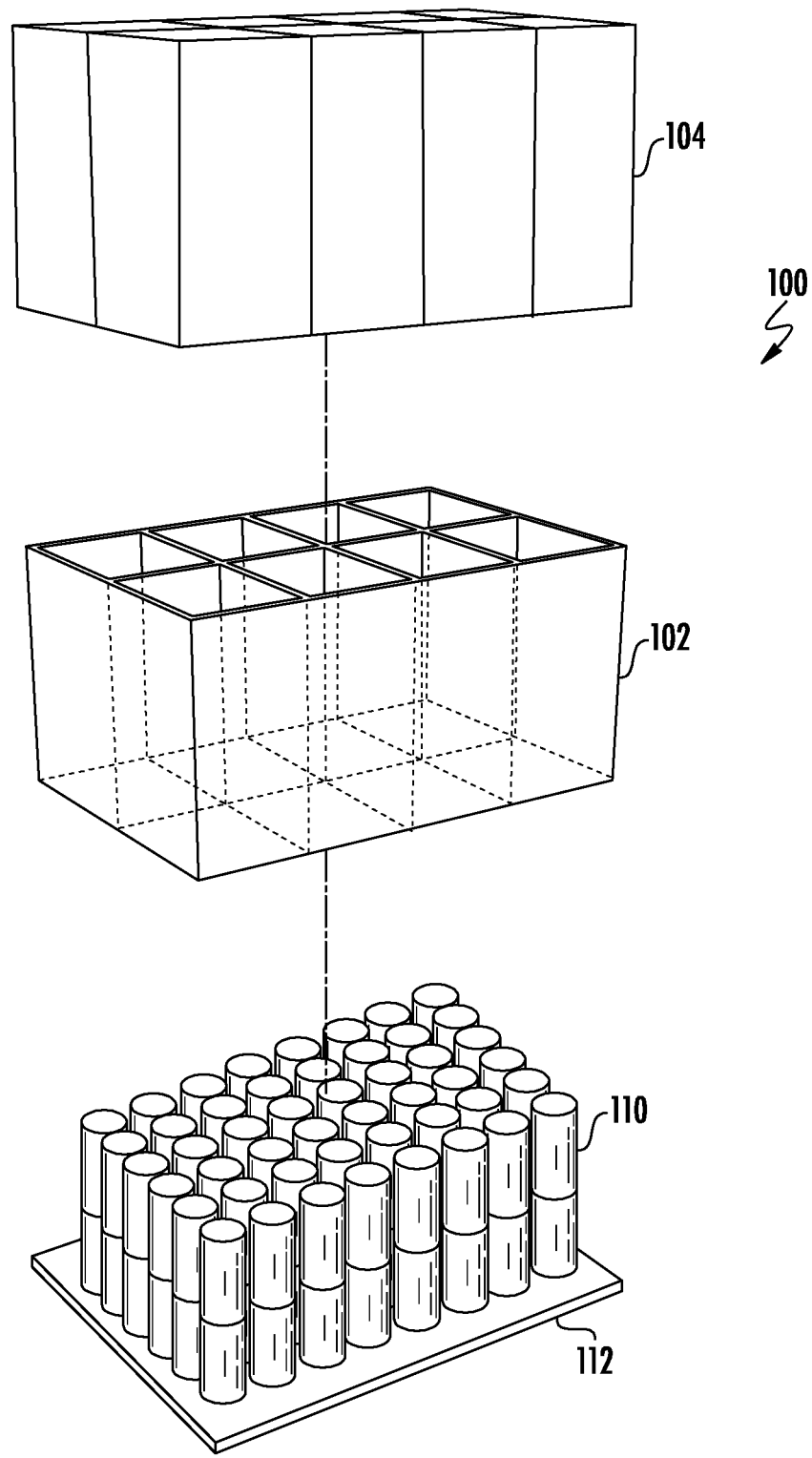
Figure 4C:
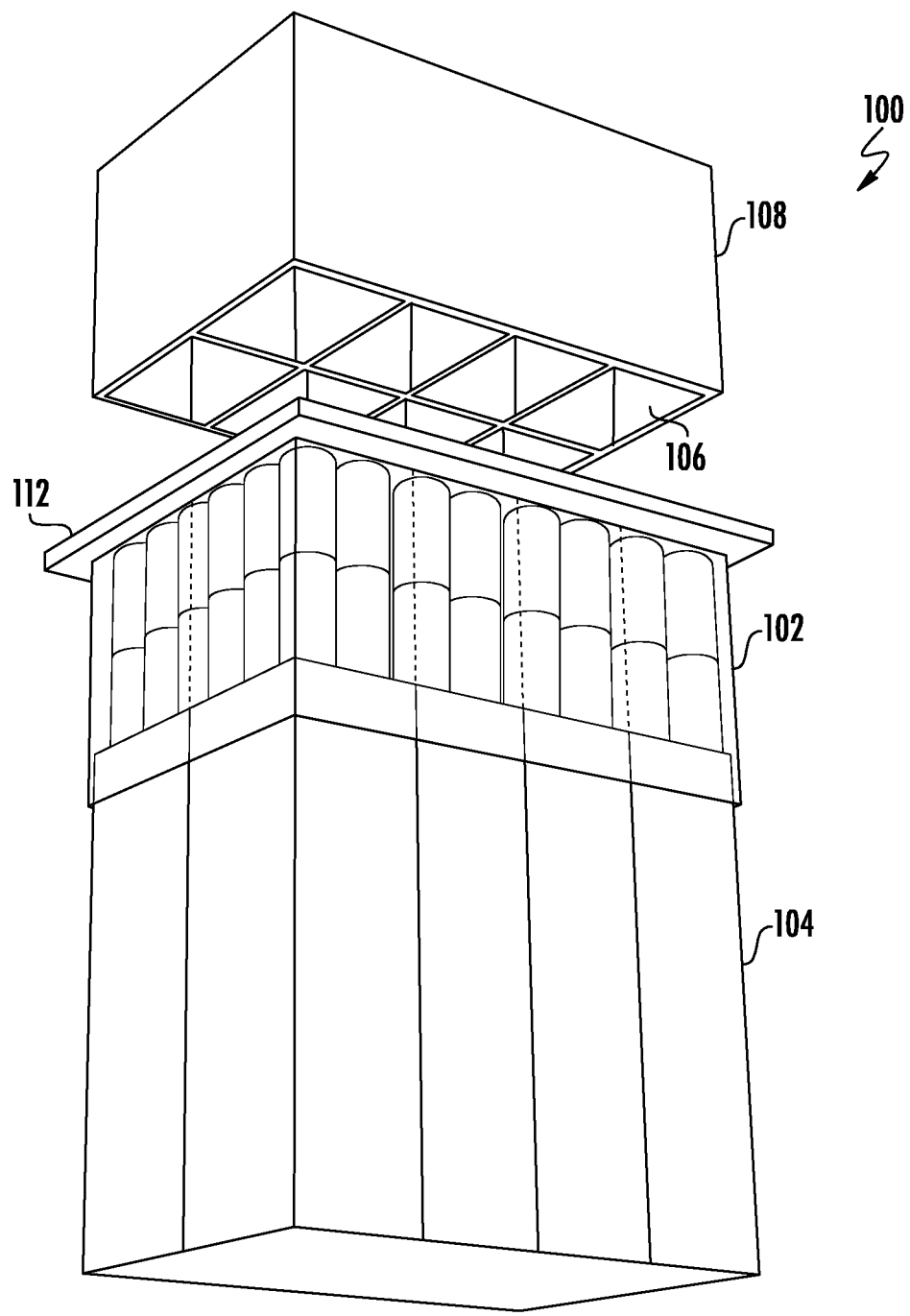
Figure 4D:
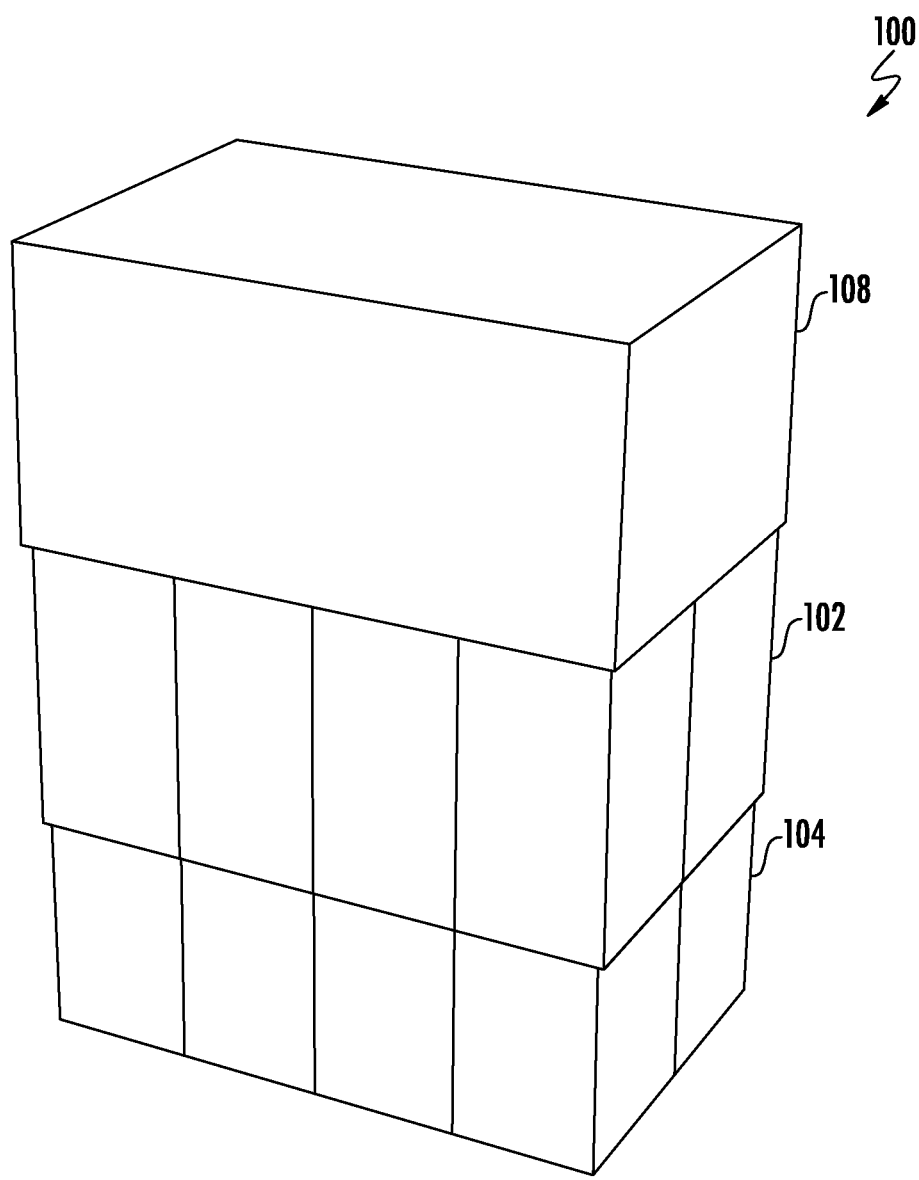

Referring now to FIGS. 4A-4D there is shown an alternate automated decant system 100. System 100 utilizes sleeve 102 and insert 104 where sleeve 102 has openings that match subtotes 106 within tote 108. Similarly, insert 104 has protrusions that are slightly smaller than the openings in sleeve 102 and allow it to slide within sleeve 102 such that the depth of the openings varies depending on the relative position between sleeve 102 and insert 104. As seen in FIG. 4B, the sleeve 102 and insert 104 are inverted over eaches 110 on supporting surface 112. Sleeve 102 is lowered to the supporting surface 112 and insert 104 is lowered until it engages the upper surface of eaches 110 such that sleeve 102 and insert 104 surround and capture the eaches 110. The unitary assembly is then inverted as seen in FIG. 4C, the supporting surface 112 removed and tote 108 engaged with the now upper surface of inverted sleeve 102. As seen in FIG. 4D, insert 104 is raised until eaches 110 bottom out in tote 108/subtote 106 where the eaches are injected into the tote. The unitary assembly of FIG. 4D may then be re-inverted and the sleeve 102, insert 104 separated from the now fully loaded tote.

Figure 5A:
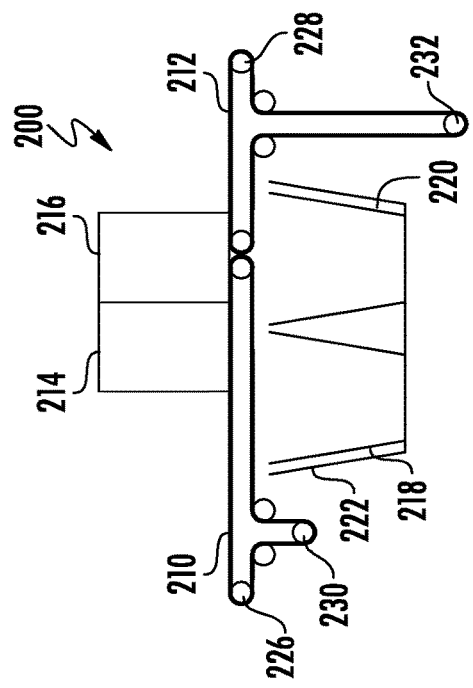
FIGS. 5A-5H are side elevation and plan views of an automated decant system for transferring eaches from a load staging surface to a tote according to further embodiments of the present technology.
Figure 5B:
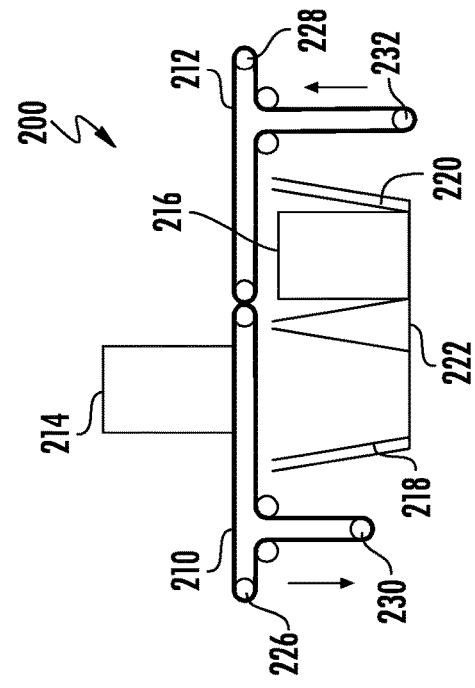
Figure 5C:
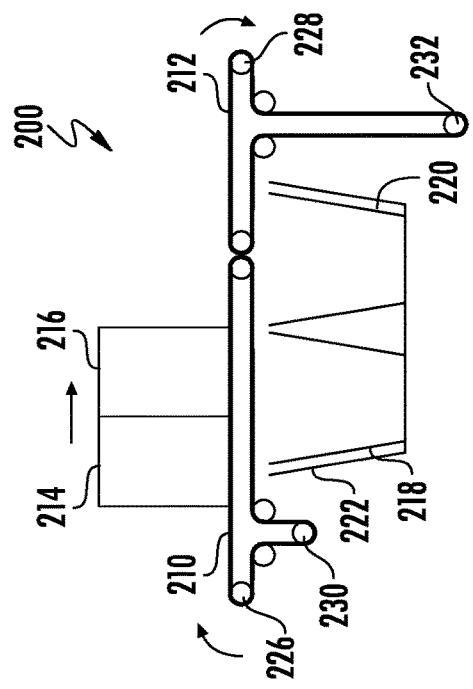
Figure 5D:
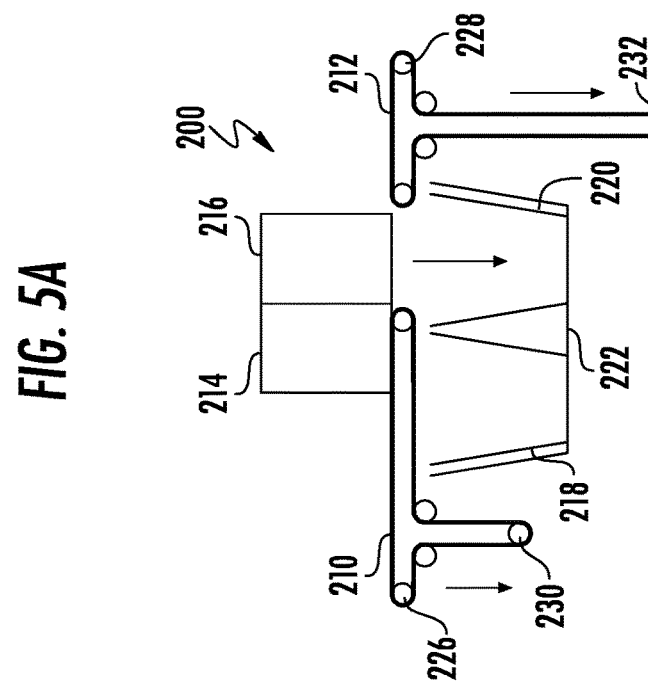
Figure 5E:
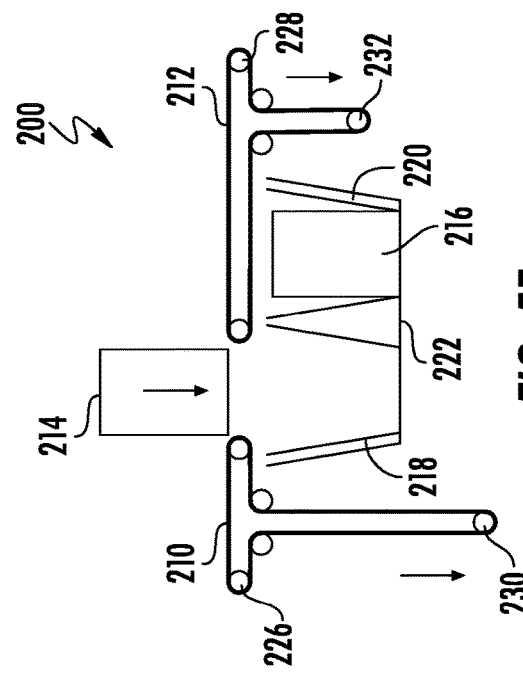
Figure 5F:
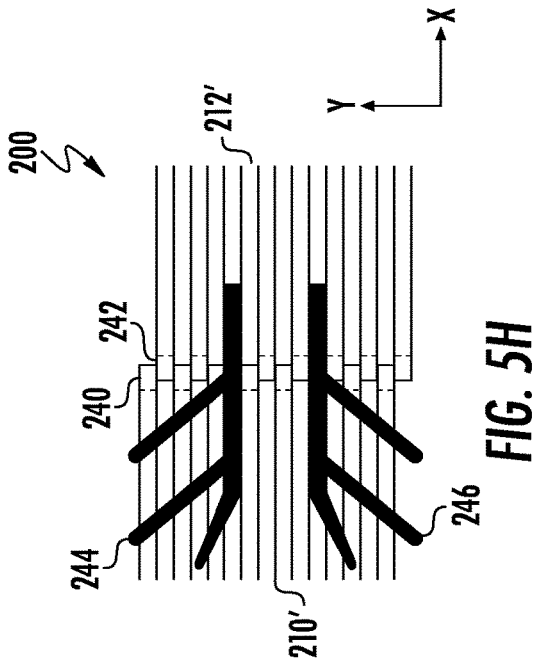
Figure 5G:
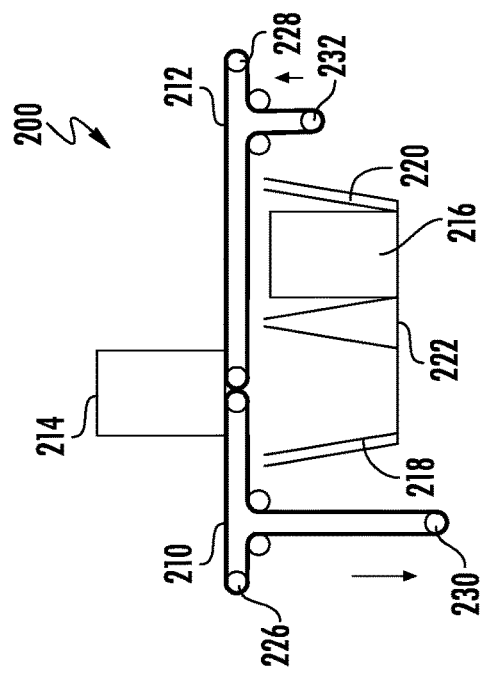
Figure 5H:
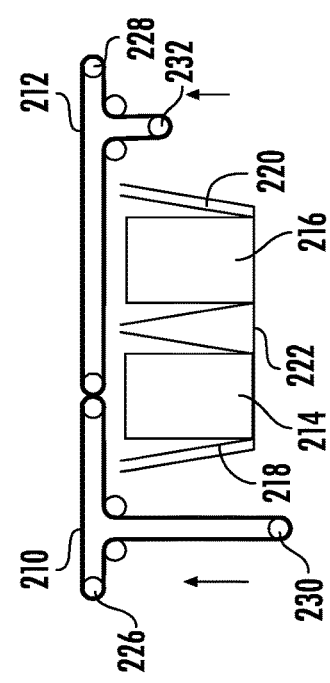

Referring to FIGS. 5A-5H, there is shown an alternate automated decant system 200. System 200 has independently driven conveyors 210, 212, that transport eaches 214, 216 in a manner as will be described to be deposited in sub-totes 218, 220 located in tote 222. In FIG. 5A eaches 214, 216 are transported to a loading position by conveyors 210, 212 independent drive rollers 226, 228 respectively that are driven in the direction of motion. In FIG. 5B, each 216 is positioned above sub-tote 220 with independent drive rollers 226, 228 stationary. In FIG. 5C with independent drive rollers 226, 228 still stationary take up rollers 230, 232 are simultaneously lowered such that an opening is formed below each 216 where during the opening formation there is no relative movement between the belt surface contacting the lower portion of each 216. Each 216 drops into sub-tote 220. It is noted that the method disclosed with respect to FIGS. 5A-5H may be employed as an alternative to release eaches in the drop and catch method described with respect to FIGS. 1A-B, 2A-D and 3A-F or otherwise. In FIG. 5D each 214 is indexed over sub-tote 218 with drive roller 226 while take up roller 232 is raised to close the opening. It is noted that the rollers which form the opening may be preloaded to a closed position or alternately may have their relative position actively controlled by a linear actuator or otherwise. It is further notes that any of the rollers may be driven, slaved, tensioned or otherwise controlled. In FIG. 5E with independent drive rollers 226, 228 stationary, take up roller 230 is lowered while take up roller 232 is simultaneously raised such that they are located below each 214 while each 214 remains stationary. In FIG. 5F with independent drive rollers 226, 228 still stationary take up rollers 230, 232 are simultaneously lowered such that an opening is formed below each 214 where during the opening formation there is no relative movement between the belt surface contacting the lower portion of each 214. Each 214 drops into sub-tote 218. In FIG. 5G take up rollers 230, 232 are raised to close the opening over each 214 and sub-tote 218. In FIG. 5H a top view of system 200 is shown with alternate conveyors 210', 212' having interleaved rollers 240, 242 that are used to form the aforementioned openings. Independently positionable guides 244, 246 are also shown to position eaches at the appropriate Y location to drop in the appropriate sub-tote. Alternately the tote may be positioned in the y direction by a stage, bot, conveyor or otherwise.

Figure 6A:
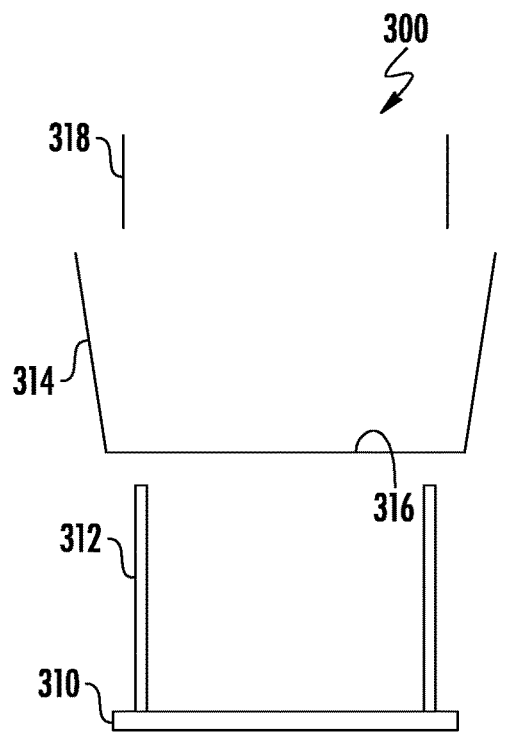
FIG. 6A-6F are side elevation views of an automated decant system for transferring eaches from a load staging surface to a tote according to further embodiments of the present technology.
Figure 6B:
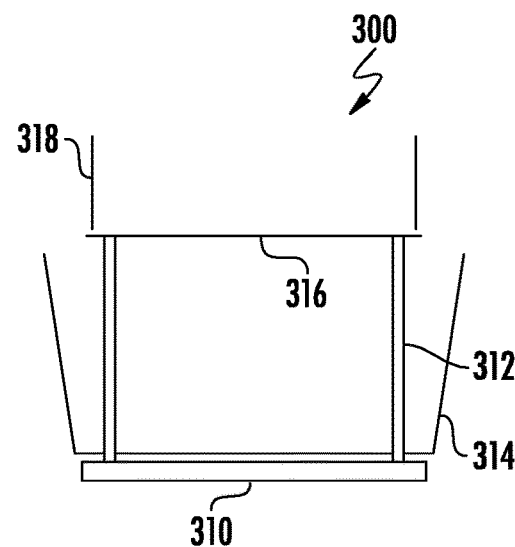
Figure 6C:
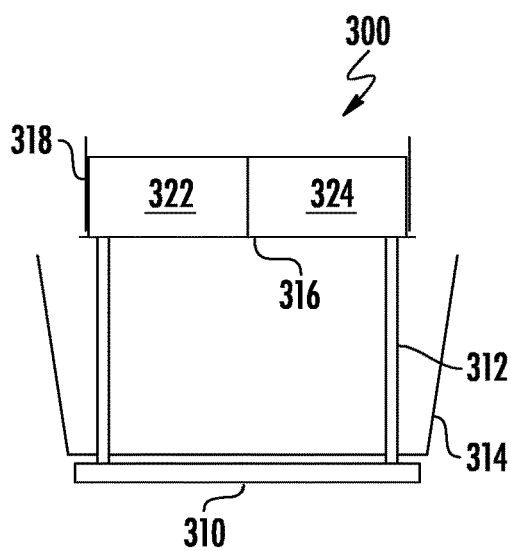
Figure 6D:
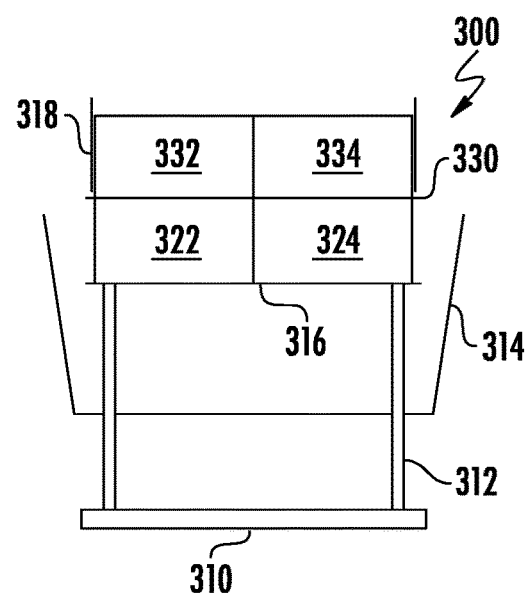
Figure 6E:
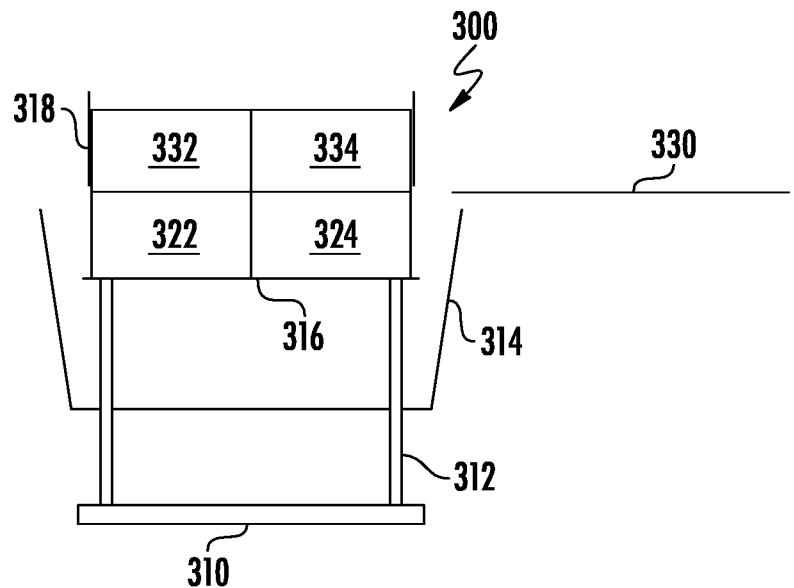
Figure 6F:
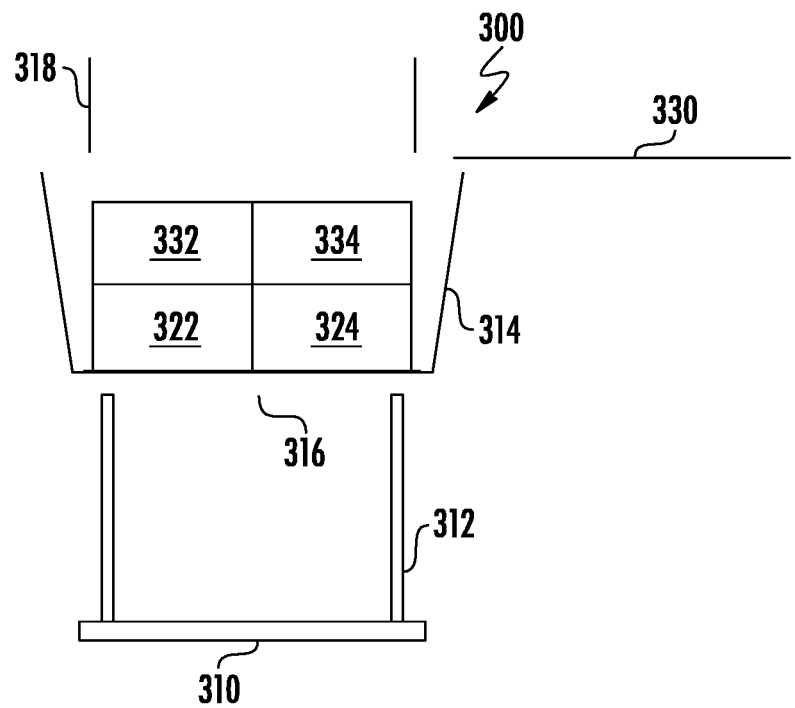

Referring to FIGS. 6A-6F, there is shown an alternate automated decant system 300. System 300 has Lift 310 with supporting feet 312 located below tote 314 with moveable base nested in tote 314. In alternate aspects, sub-totes may be provided with similar features. In FIG. 6A, tote 314 is moved into a loading position below guides 318. In FIG. 6B, moveable base 316 is moved into a loading position below guides 318. In FIG. 6C, eaches 322, 324 are transported to a loading position by conveyors or otherwise onto moveable base 316. In FIG. 6D lift 310 lowers eaches 322, 324 and plate 330 is placed slightly above them so that eaches 332, 334 can be positioned above eaches 322, 324. In FIG. 6E plate 330 is extracted so eaches 332, 334 are stacked on eaches 322, 324. In FIG. 6F lift 310 lowers eaches 322, 324, 332, 334 and feet 312 clear through holes in the base of tote 314 such that tote 314 can be transported with eaches 322, 324, 332, 334.

Figure 7:
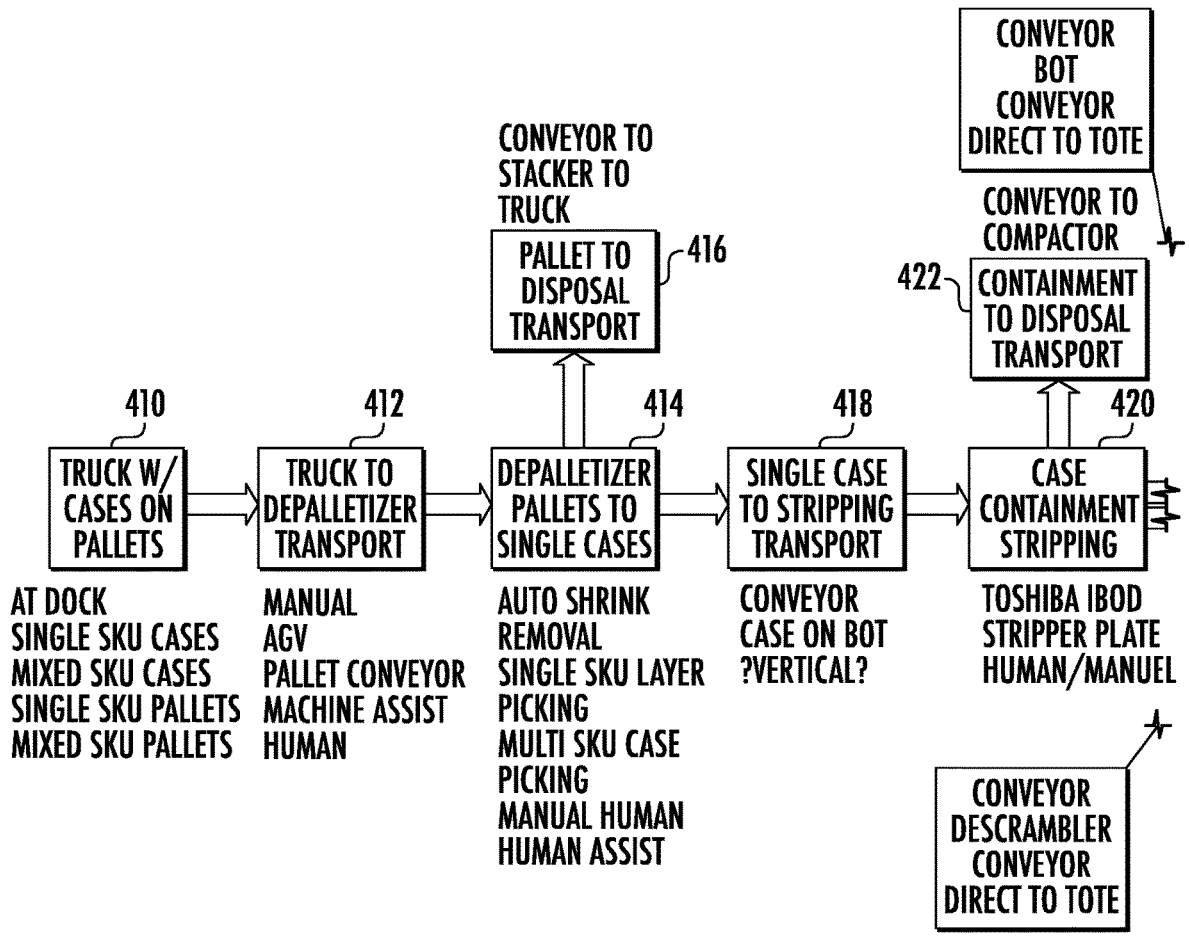
FIG. 7 is a flowchart illustrating a system for receiving inventory and decanting it to totes for storage according to an embodiment of the present technology.

Referring to FIG. 7 there is shown a flow diagram of system 400. Decant system 400 is provided to replenish inventory in storage and retrieval system 402 from trucks or other suitable delivery approach where the trucks have cases on pallets or otherwise. Storage and retrieval system 402 may be as disclosed in US Patent Application Publication No. US2017/0313514 A1 which is incorporated by reference herein in its entirety. In alternate aspects, automated decant system 400 may be provided to replenish any suitable inventory or otherwise. Each SKU has a recipe and flow through the system and the system may have all the necessary subsystems including decant to go from any suitable type of delivery method such as pallet, box or otherwise to the tote or sub-tote (robotic, conveyor, human . . . ). For example, stripped or partially stripped cases or totes are directed to loading work cells based on type of each packaging i.e. directing the cases that are stripped or partially stripped based on recipe for the SKU. The recipe generation can be automated in software executed by a control system based on case and product classification, for example, case SKU, CAD and content feature. Decant station 428 may be provided operated by worker, robotic or conveyor based decant. A human operated manual load decant station may be provided where cases may be transported by conveyors, bots or otherwise and eaches loaded by the operator to a sub tote on a conveyor, bot or otherwise. For example, if a case transporting bot is used, the workstation can be substantially identical to an ASRS workstation. A manual station may be used for SKU's that do not lend themselves to automation and may be co-located with automated stations so that the operator can assist the automatic stations on error. A robotic decant load station may be provided with similar features as the manual workstation but with a robot replacing the human operator and utilizing machine vision and a gripper/tool changer. By way of example, a robot can pick direct from stripped or partially stripped cases from a bot or conveyor with stripped case. Here, the robotic cell may use machine vision and tool changer to handle different SKU's. For example, the tool changer can access tools that picks eaches (ex: various grippers suited to different packaging such as bottled goods) or batches of eaches (ex: canned goods with standard can size can be batch picked with a vacuum assisted layer/partial layer picker tooling). A conveyor decant load station may be provided as disclosed and may further include a descrambler or be provided such that eaches are directed directly from the end of a conveyor to an appropriately positioned tote where a conveyor based station can induct SKU's direct to tote on or off Bots, stages or other conveyors. Trucks with boxes or cases on pallets 410 or otherwise deliver SKU's in boxes, pallets with cases of common SKUs that are consistently layered (can have the same or different SKUs per layer) or pallets with cases of mixes SKUs that are inconsistently layered. The cases may be cardboard boxes, shrink wrapped trays, shrink wrap only, cardboard trays with walls, cardboard base or otherwise. Pallets may be transported to de-palletizer 414 manually, by AGV, pallet conveyor or via machine assisted human handling. De-palletizer 414 converts pallets to single cases where de-palletizer 414 may include an automatic shrink wrap removal device, batch single SKU robotic layer picking, robotic individual case picking for single or multi SKU pallets or may be done by workers either manually or machine assisted. A conveyor or other transport 416 may transport pallets and shrink wrap to a stacker or otherwise to disposal. Individual cases may be transported 418 via conveyor, bot or otherwise to case containment stripping module 420. Where cases may be fully or partially stripped of shrink wrap, cardboard or otherwise. A conveyor or other transport 422 may transport shrink wrap or cardboard or other packaging materials via conveyor for compacting or otherwise to disposal. Fully stripped cases may be transported 424 via conveyor or descrambler for positioning in a direct to tote decant 428, for example as previously described or otherwise. Alternately, partially stripped cases may be transported 426 via conveyor or bot to decant 428, for example, for robotic decant or worker decant. Alternately, partially stripped cases may be transported 426 via conveyor or bot to buffer 430 for storage until needed in ASRS 412 via decant 428. A conveyor or other transport 432 may transport shrink wrap or cardboard or other packaging materials via conveyor for compacting or otherwise to disposal. Decant 428 may be provided with suitable workstations, for example robotic, human or conveyor based where the workstations may be individually located or co-located such that the human worker can quickly assist in the event on mis pick or mis place of SKU's in totes. Here, decant station 402 may be hybrid with conveyors for some SKU's, robots for others, humans for others with different SKU's directed to the appropriate station for maximum efficiency. Decant may be direct to tote 436, for example, on conveyor, indexer or otherwise or alternately direct to tote on bot 438. Filled or partially filled totes may be transported to a buffer 440 or alternately via bot 442, 444 to ASRS 402. Here, bots can enter or exit the ASRS to the decant module via transit decks, to and from the aisles, via verticals or any suitable combination of them. Bots return from ASRS 412 for replenishment 448 and may go directly to decant 450 or may unload totes 452 for disassembly where totes and sub-totes may be disassembled and buffered 454 for reassembly 456 and transport to bots or decant as the case may be. Alternately, bots may be rerouted 460 back to ASRS 402 after tote transfer. A suitable gantry and workstation for tote sub-tot assembly and disassembly is disclosed in U.S. Provisional Patent Application Ser. No. 62/542,551 filed on Aug. 8, 2017 and entitled "Universal Gripper for Tote and Sub-Tote Transport" which is incorporated by reference herein in its entirety. In the disclosed system, Bots may be used including leveraging the vertical capabilities to reduce overall system footprint, for example, partially stripped cases may be transferred from pallets to bots so the workstations can operate similarly to the ASRS workstations, for example, as disclosed in human or robotic workstations as disclosed in FIGS. 24 and 54 of the previously incorporated US Patent Application Publication No. US2017/0313514 A1. Further, with elevators or vertically operating bots, the subsystems may be stacked utilizing conveyors, elevators, bot vertical or otherwise to minimize footprint and space required for the system. Here, a multi-level decant system may be provided, for example, with dock to decant subsystems packaged below or adjacent to the decant module(s). Alternately, the system may be packaged as a linear system the length of storage/ASRS to minimize footprint or any suitable alternate packaging of the decant and dock to decant may be provided to optimize footprint.

Figure 8A:
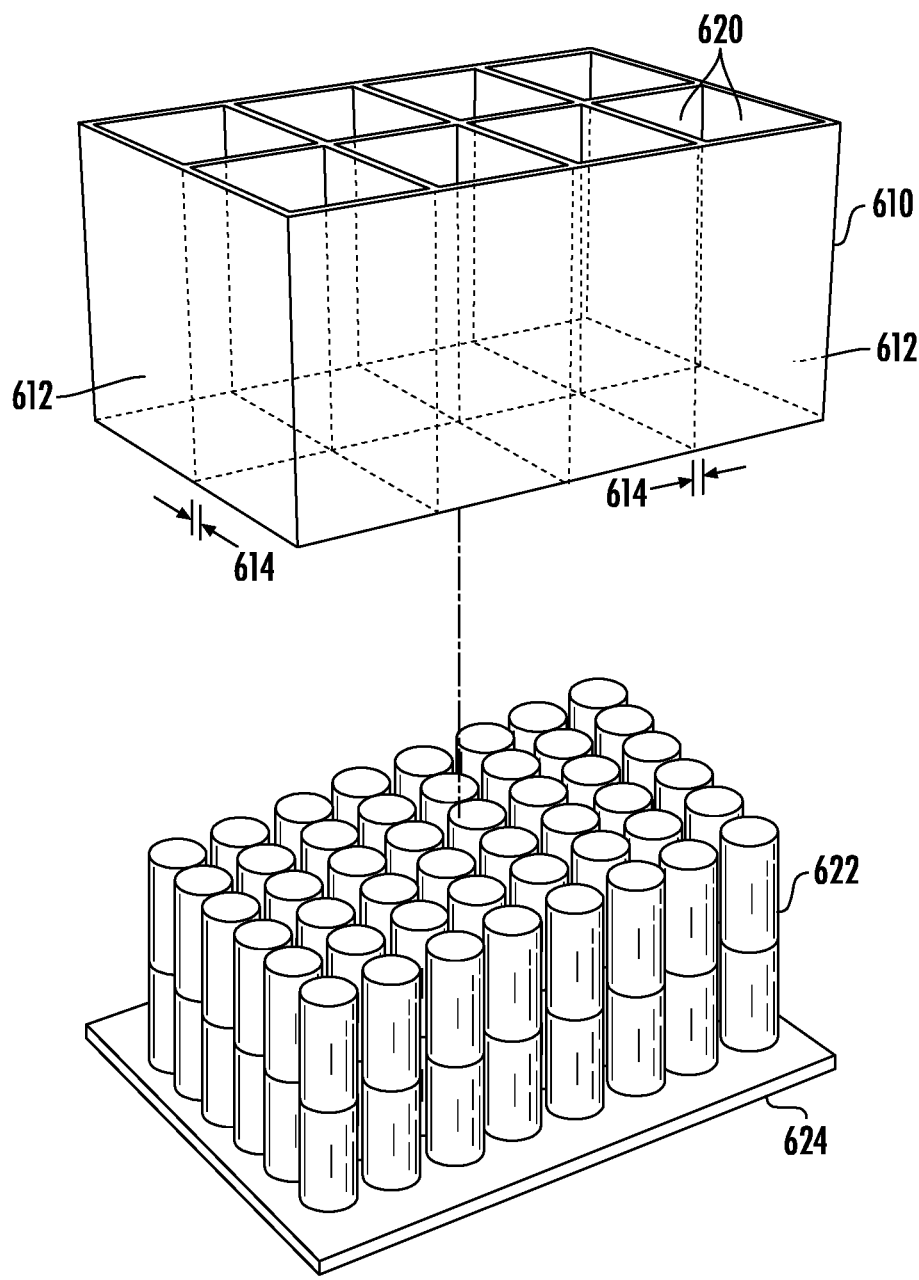
FIGS. 8A and 8B are perspective views of an automated decant system for transferring eaches from a load staging surface to a tote according to further embodiments of the present technology.
Figure 8B:
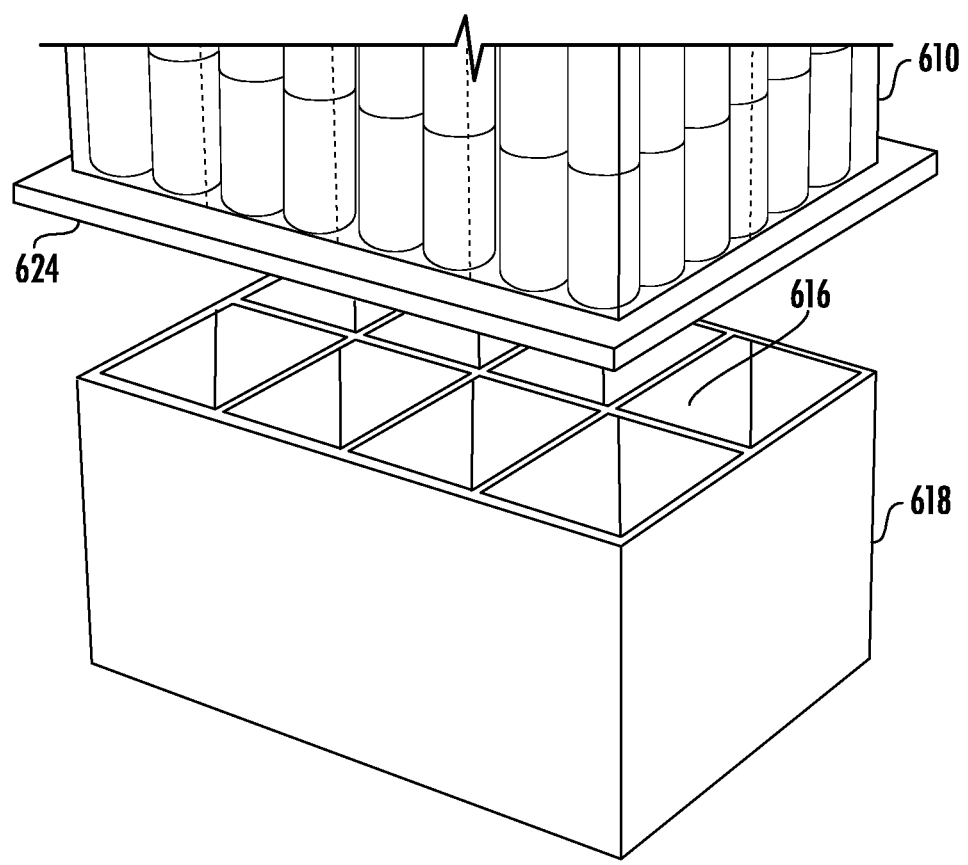

Referring now to FIGS. 8A and 8B there is described an alternate method for automated decant. Sleeve 610 is provided having one or more spaced modules 612 that are spaced 614 such that they can nest within sub-totes 616 of tote 618. Further, modules 612 have one or more inflatable bladders 620 on the inner wall(s) of the module. Appropriately spaced eaches are located on support 624 and the sleeve 610 is lowered over the eaches as shown in FIG. 8B. The bladder(s) are then inflated capturing the eaches. After capture, the support 624 can be removed and the sleeve 610 along with the captured eaches 622 can be lowered into the subtotes 616 of tote 618 with the modules 612 nested within the subtotes 616. At this point, the bladders 620 can be deflated releasing the eaches as the eaches are supported by the subtotes and sleeve 610 can be withdrawn from now loaded tote 618.

Figure 9A:
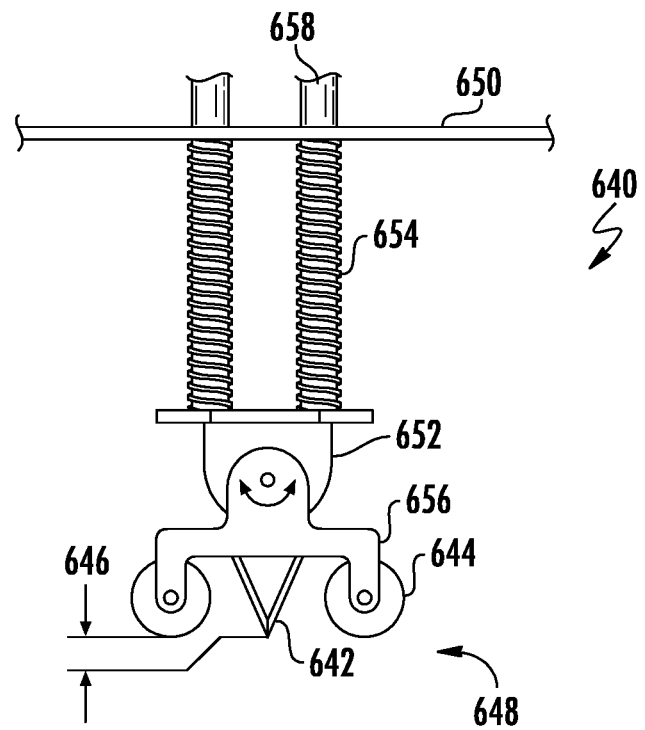
FIG. 9A is a top view of a case packaging cutter.
Figure 9B:
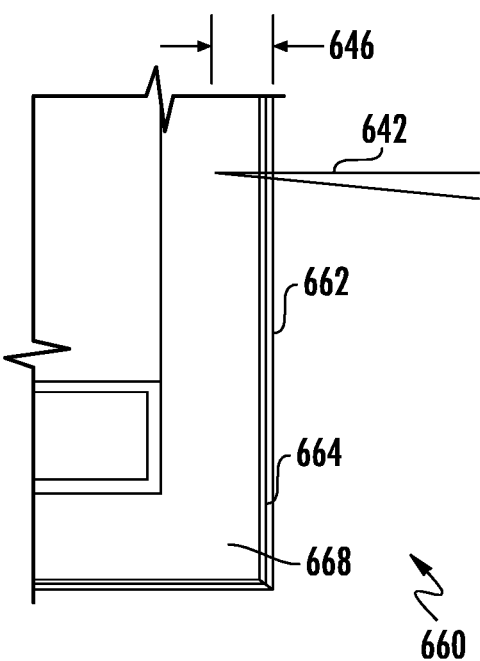
FIG. 9B is a schematic section view of a case corner with a case packaging cutter.

Referring now to FIG. 9A there is shown a top view of a case packaging cutter 640. Referring also to FIG. 9B there is shown a schematic section view of a case corner 660. Case packaging cutter 640 has a cutter head 642 that may be a fixed or rotating razor edge, bit or other cutter suitable for cutting through plastic shrink-wrap, cardboard or shrink-wrap only without cutting the underlying cardboard or product that is subject to the shrink-wrap. The cutter may act passively on its springs in order to cooperate with damaged and deformed boxes. Rollers 644 are provided slightly recessed, for example 0.005-0.030" or any suitable depth, such that when rollers 644 are depressed against a surface 662 of case 660, blade 642 pierces plastic wrap 664 and cardboard 668 of case 660. As case 660 is moved horizontally in direction 648 parallel to the tangent faces of rollers 644, the shrink wrap 664 is cut the length of case 660. Rollers 644 and blade 642 are mounted to pivot frame 656 which may be fixedly or pivotally mounted to spring loaded support 652 having shafts 658 which are spring loaded 654 against a fixed guide mount 650. The fixed guide mount may be moveable and then fixed with respect to the box surface 662 such that springs 654 are suitably compressed to keep the rollers 644, and hence blade 642, preloaded against the surface 662 to effectively cut the shrink-wrap 664. Pivot frame 656 may further be pivotable with respect to mount 652 such that surface imperfections and discontinuities in box surface 662 will not affect cutting of the shrink-wrap 664.

Figure 10A:
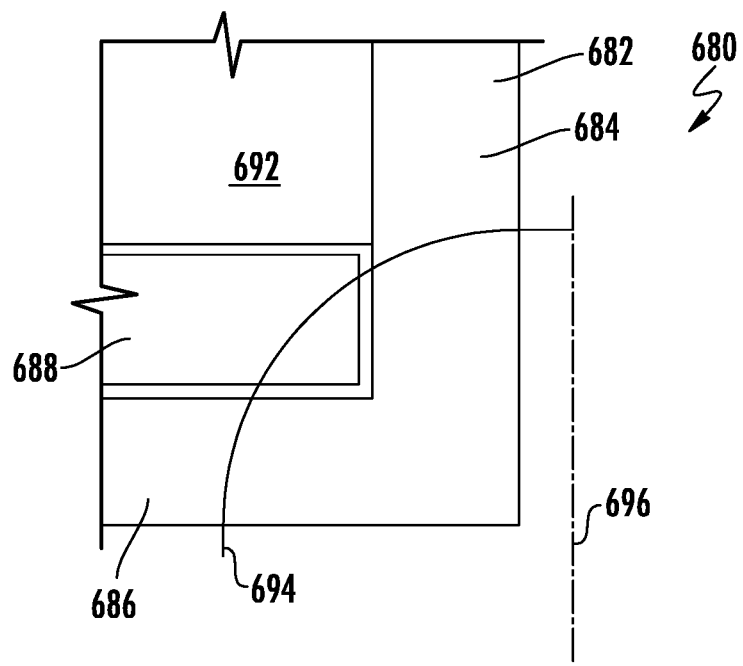
FIGS. 10A and 10B are respectively schematic section views of a case corner with a router-based case packaging cutter.
Figure 10B:
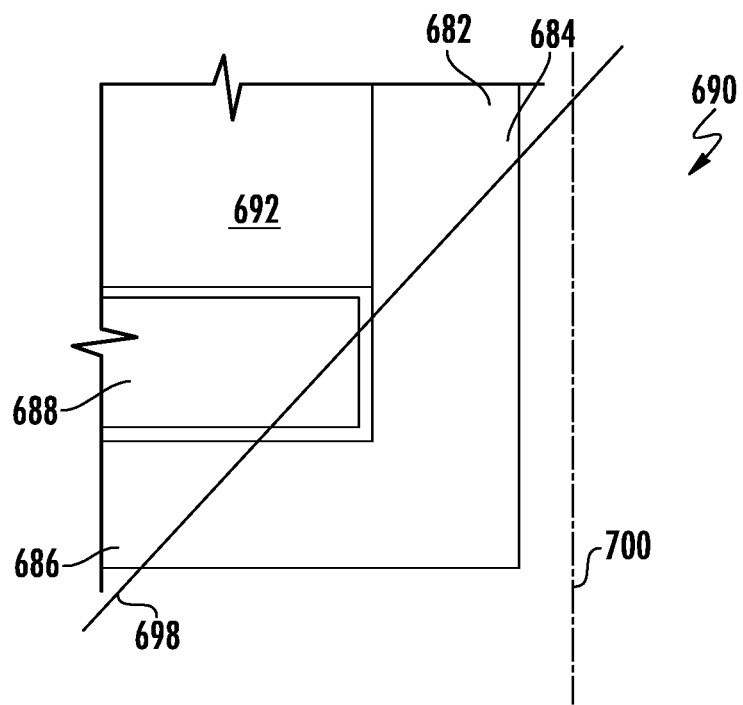

FIGS. 10A and 10B are, respectively, schematic section views of case corner 680, 690 with a router based case packaging cutter. Box 682 has cardboard side 684, base 686 and inner folded base 688. Box 682 has enclosed eaches 692. In FIG. 10A, router bit 694 has a radiused cutting edge that rotates about router spin axis 696 where bit 694 cuts completely through cardboard bottom 686 and side 684. Bit 694 is set to only partially cut through folded cardboard base 688 and completely misses eaches 692 so as not to damage them. Similarly, in FIG. 10B, router bit 698 has a flat conical cutting edge that rotates about router spin axis 700 where bit 698 cuts completely through cardboard bottom 686 and side 684. Bit 698 is set to only partially cut through folded cardboard base 688 and completely misses eaches 692 so as not to damage them.

The cutting tool shown in FIGS. 9A and 9B as well as the router cutting tools of FIGS. 10A and 10B may be employed alone or in combination with each other in an automated case-material remover or case stripper where the cutting tools may be used to separate the upper and lower portions of shrink wrap and/or cardboard such that the shrink wrap and/or cardboard may be removed in an automated fashion as will be described in greater detail. Upon completion of the case material removal or case stripping, the exposed eaches may be advanced by any suitable accumulation table or an accumulation table that organizes the eaches in positions suitable for deposition into totes by the load staging table. Such an accumulation or load staging table may or may not utilize or be provided with partitions depending on how well organized the eaches are with respect to the tote or sub-totes within the tote. One such exemplary accumulation table will be described in greater detail. In alternate aspects, any suitable case stripping module or accumulation module may be provided.

Figure 11A:
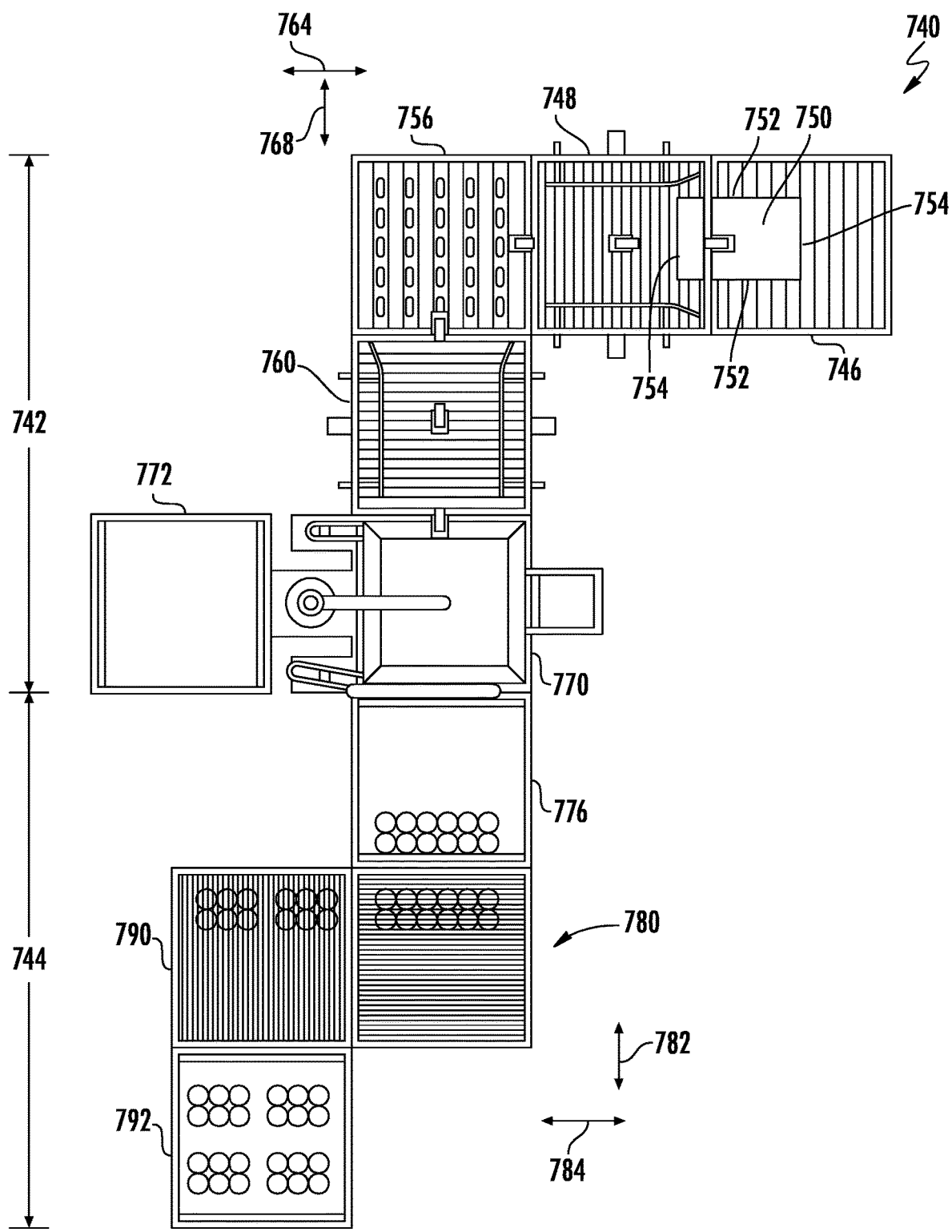
FIGS. 11A and 11B are top and isometric views respectively of a case stripping and accumulation module.
Figure 11B:
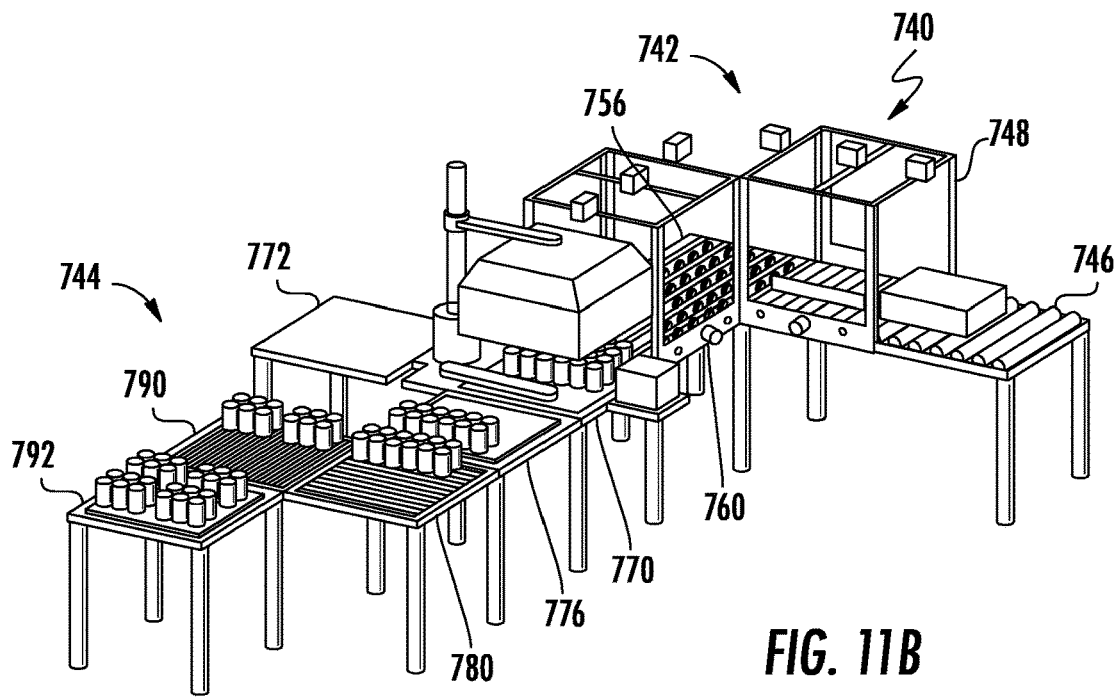

Referring now to FIGS. 11A and 11B, there is shown top and isometric views, respectively, of case stripping and accumulation module 740. Module 740 has case stripper module 742 and accumulation module 744. Case stripper module 742 has incoming case conveyor 746 that feeds first edge cutting module 748 where incoming cases 750 are staged and fed into first edge cutting module 748 where edges 752 of cases 750 are cut. Case stripper module 742 further has two-dimensional case conveyor 756 that feeds second edge cutting module 760 where incoming cases 750 that have had edges 752 cut by module 748 are staged from first direction 764 and then fed in second direction 768 into second edge cutting module 760 where edges 754 of cases 750 are cut. Upon exit of second edge cutting module 760, the peripheral edges 752, 754 of cases 750 have been removed allowing the case material (cardboard, shrink wrap or otherwise) to effectively be removed exposing the eaches for decant downstream into totes. Case stripper module 742 further has case packaging removal module 770. Case packaging removal module 770 receives cases 750 with the peripheral edges 752, 754 of cases 750 removed and removes case material, exposing the underlying eaches where the case material is removed by trash conveyor 772. Accumulation module 744 has first staging conveyor 776 that accepts the eaches which may be self-supporting eaches from case packaging removal module 770. Accumulation module 744 further has first two-dimensional each conveyor 780 that accepts from and cooperates with first staging conveyor 776 to selectively separate the eaches in a first direction 782. Accumulation module 744 further has second two-dimensional each conveyor 790 that accepts from and cooperates with first two-dimensional each conveyor 780 to selectively separate the eaches in a second direction 784. Accumulation module 744 further has second staging conveyor 792 that accepts from and cooperates with second two-dimensional each conveyor 790 to selectively separate the eaches as a group in the first direction 782 whereby an entire case of eaches may be selectively separated into subgroups of eaches as shown by way of non-limiting example as shown in FIGS. 11A and 11B. Here, module 740 strips external case material and organizes the eaches in position suitable for deposition into totes by the load staging table which may or may not utilize or be provided with partitions depending on how well organized the eaches are with respect to the tote or sub-totes within the tote.

Figure 12:
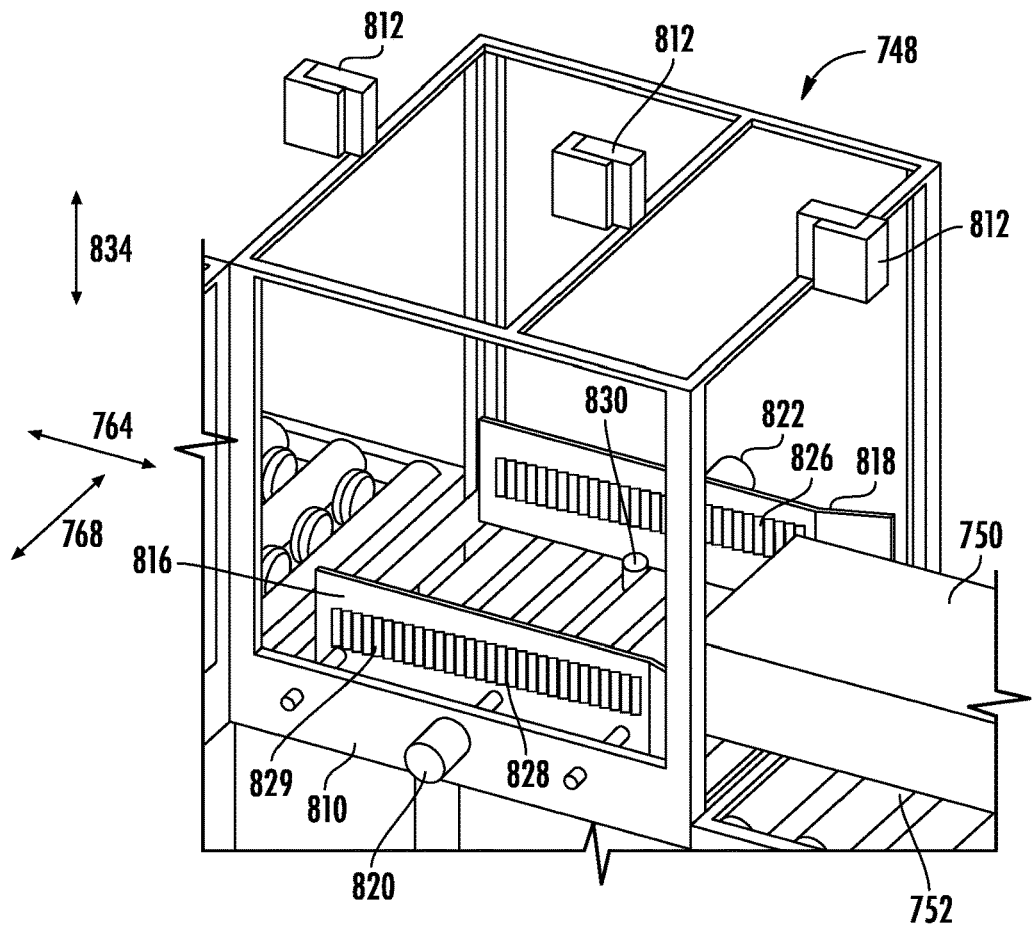
FIG. 12 is a partial isometric view of an edge cutting module.

Referring now to FIG. 12, there is shown a partial isometric view of first edge cutting module 748. Incoming cases 750 are staged and fed in direction 764 into first edge cutting module 748 where edges 752 of cases 750 are cut. Second edge cutting module 760 may have features similar to first edge cutting module 748 but where second edge cutting module 760 is arranged to cut edges 754 in direction 768. First edge cutting module 748 has conveyor base 810 which selectively drives case 750 in direction 764. Sensors 812 may be provided where sensors 812 may be cameras, optical sensors or any suitable sensor to detect leading and trailing edges of case 750 as well as sides of case 750 as needed. First and second guides 816 and 818 are selectively moveable and positionable in direction 768 by actuators 820, 822 where actuators may be stepper driven screws or any suitable actuator. In one aspect, first and second guides 816 and 818 may have secondary drive conveyors 824 and 826 which are slightly angled as shown with respect to direction 764 where secondary drive conveyors 824 and 826 urge the case 750 down during the cutting operation. Cutters 828, 830 are also provided as described with respect to the cutting tool shown in FIGS. 9A and 9B as well as the router cutting tools of FIGS. 10A and 10B where cutters 828, 830 may be employed alone or in combination with each other to cut case material, for example cardboard or plastic shrink wrap or otherwise. Here, cutters 828, 830 may be independently positionable with respect to first and second guides 816 and 818, for example in directions 768, 834 automatically or otherwise where the location and depth of cut may be set by recipe or type of case to be processed.

Figure 13:
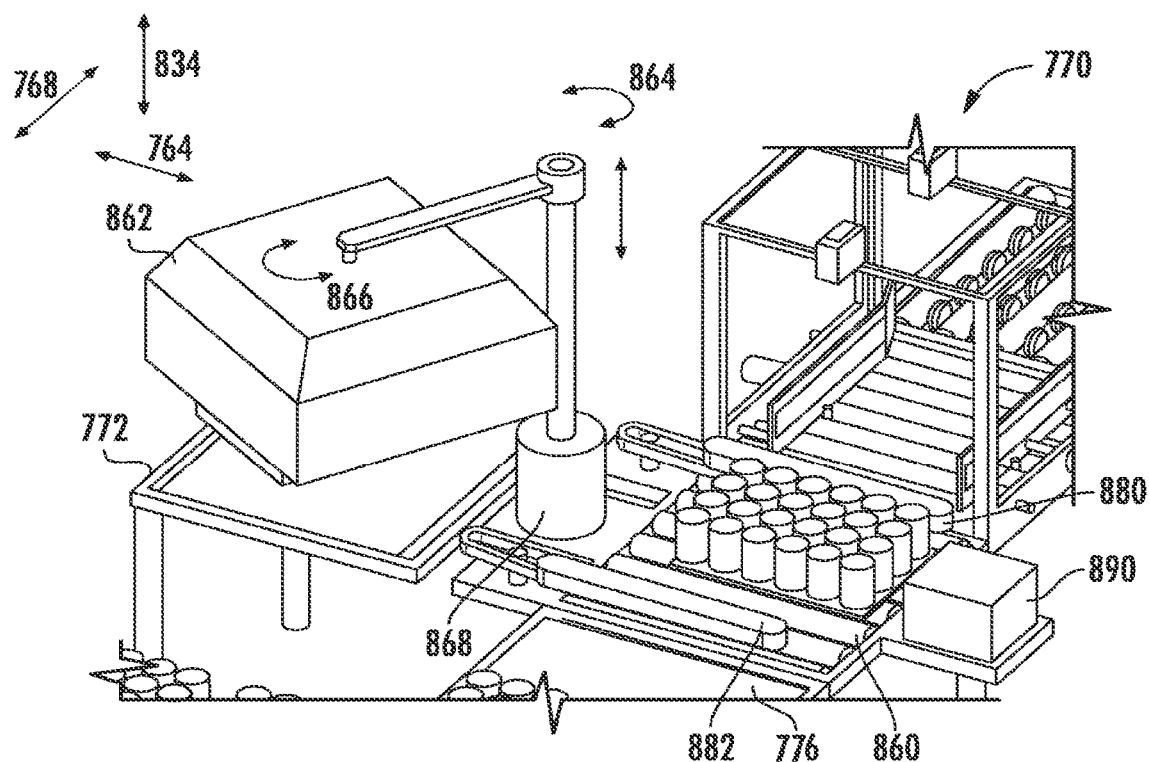
FIG. 13 is a partial isometric view of a case packaging removal module.

Referring now to FIG. 13, there is shown a partial isometric view of case packaging removal module 770. Case packaging removal module 770 receives cases 750 with the peripheral edges 752, 754 of cases 750 removed and removes case material exposing the underlying eaches where the case material is removed by trash conveyor 772. Case packaging removal module 770 has conveyor base 860 which selectively drives case 750 in direction 768. The conveyor in conveyor base 860 may be a roller or belt conveyor where the conveyor may be a vacuum conveyor to hold the base of case 750 relative to the eaches. Sensors may be provided where sensors may be cameras, optical sensors or any suitable sensor to detect leading and trailing edges of case 750 as well as sides of case 750 as needed. First and second guides (not shown) may also be provided, selectively moveable and positionable in direction 764. Vacuum head 862 is shown driven by multi axis drive 868 where vacuum head is positionable in one or more of directions/axes 834, 864 and 866. Vacuum head 862 may have multiple bladders with or without plates and is adapted to grip an relocate/position cardboard case lids, case plastic wrap, product or groups of eaches or the base of the case alone or in combination. By way of example, vacuum head 862 may pick or position any of the foregoing from the conveyor 860 and place to the trash conveyor 772. Alternately, vacuum head 862 may pick or position any of the forgoing, for example, the eaches from the conveyor 860, and place back to the conveyor 860, for example, after the base of the case is removed. Although drive 868 is shown between conveyors 860 and 772, drive 868 may be otherwise positioned, for example above conveyors 860, 772 so there is a clear path between conveyors 860, 772. Although conveyor 772 is shown adjacent conveyor 860, conveyor 772 may otherwise be placed or one or more conveyors 772 may be provided, for example, below conveyor 776 or otherwise. An example case material removal sequence: 1) head 862 removes the case top and places it on trash conveyor 772, 2) head 862 picks up the eaches from case 750 base, 3) conveyor 776 is raised in direction 834, 4) case base is ejected under conveyor 776 to trash via conveyor 772, 5) conveyor 776 is lowered and head 862 places eaches on conveyor 860, 6) conveyor 860 advances eaches to conveyor 776. Independently moveable fences 880, 882 may also be provided where independently moveable fences 880, 882 may be positioned to block or push/move cases or eaches or to allow cases or eaches to pass by independently moveable fences 880, 882 unobstructed. By way of example, fence 882 may block eaches where the base of the case 750 is ejected under conveyor 776 as previously described without head 862 picking up the eaches. By way of further example, fence 880 may push eaches onto conveyor 776 while vacuum conveyor 860 retains the base of case 750. Blower 890 may be provided, for example, to blow the case 750 base onto conveyor 772. Although representative sequences have been described, any suitable combination of actions by subcomponents of module 770 may be provided.

Figure 14:
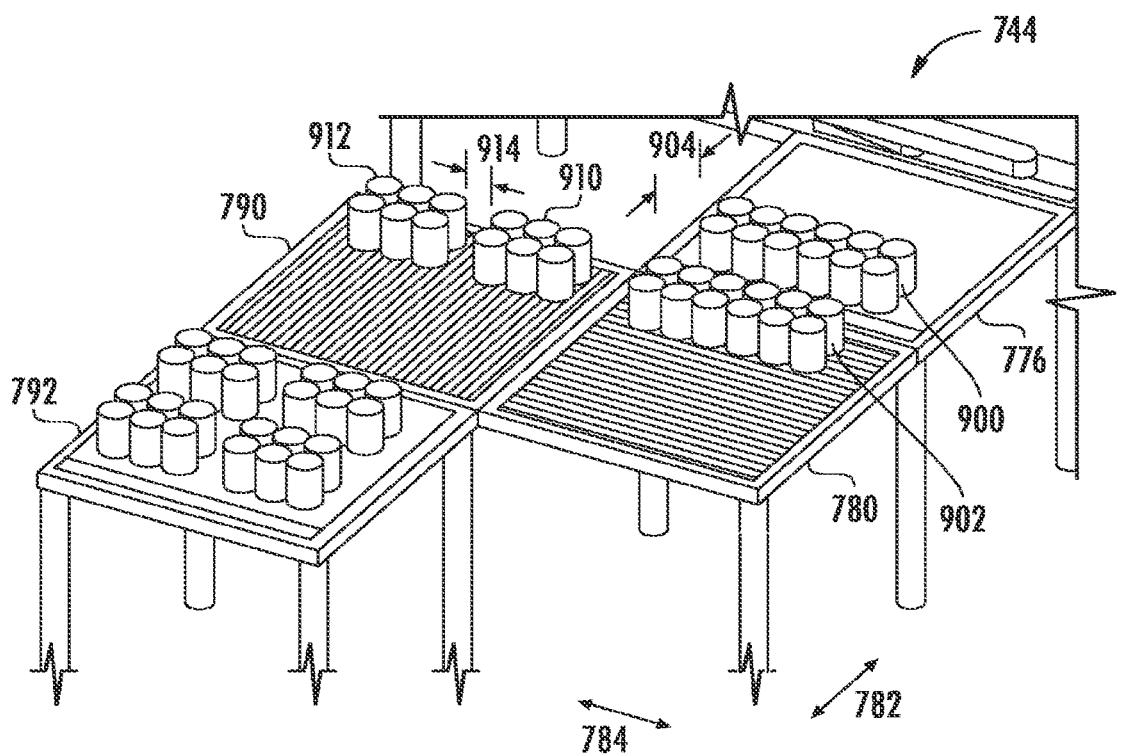
FIG. 14 is a partial isometric view of an accumulation module.

Referring now to FIG. 14, there is shown a partial isometric view of accumulation module 744. Accumulation module 744 has first two-dimensional each conveyor 780 that accepts from and cooperates with first staging conveyor 776 to selectively separate the eaches in a first direction 782. Here, conveyor 776 and 780 advances the eaches groups 900, 902 till they are split between conveyors 776, 780. Conveyor 780 then advances eaches 902 till a predetermined separation between the eaches 904 is achieved. Although not shown, eaches 900 may then be advanced to conveyor 780 maintaining the separation for further separation as will be described. Accumulation module 744 further has second two-dimensional each conveyor 790 that accepts from and cooperates with first two-dimensional each conveyor 780 to selectively separate the eaches in a second direction 784. Here, conveyor 780 and 790 advances the eaches groups 910, 912 till they are split between conveyors 780, 790. Conveyor 790 then advances eaches 912 till a predetermined separation between the eaches 914 is achieved. Accumulation module 744 further has second staging conveyor 792 that accepts from and cooperates with second two-dimensional each conveyor 790 to selectively separate the eaches as a group in the first direction 782 whereby an entire case of eaches may be selectively separated into subgroups of eaches as shown by way of non-limiting example as shown in FIG. 14.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances.

We claim:

1. An automated decant system for transferring eaches received at a facility into a tote, the automated decant system comprising:
   a load-staging table configured to receive and support the eaches, and configured to drop the eaches to a position beneath the load-staging table; and
   a mobile robot configured to support the tote as the mobile robot moves around the facility, including to the position beneath the load-staging table;
   wherein the load-staging table is configured to drop the eaches to the position beneath the load-staging table when the tote is at the position beneath the load-staging table to drop the one or more sets of eaches into the tote.

2. The automated decant system recited in claim 1, further comprising a movable support surface over the position beneath the load-staging table, the eaches being positioned on the movable support surface at the load-staging table.

3. The automated decant system of claim 2, wherein the movable support surface is configured to slide laterally or rotate about an axis downward from beneath the eaches at the load-staging table, at which point the eaches drop into the tote.

4. The automated decant system recited in claim 2, further comprising an actuator configured to withdraw the movable support surface from beneath the eaches at the load-staging table.

5. The automated decant system recited in claim 2, further comprising one or more dividers configured to organize the eaches into one or more sets of eaches on the load-staging table.

6. The automated decant system of claim 5, wherein the one or more dividers maintain the eaches in the one or more sets as the eaches drop into the tote.

7. The automated system of claim 5, wherein the tote comprises one or more sub-totes, the one or more dividers defining positions of the one or more sets of eaches corresponding to positions of the one or more sub-totes in the tote.

8. The automated decant system recited in claim 1, wherein the eaches are received at the facility packaged in cases on pallets, and the automated decant system further comprises a robotic case de-palletizer module configured to convert pallets of packaged cases to individual, unwrapped cases.

9. The automated decant system of claim 8, wherein the robotic case de-palletizer module is configured to remove shrink wrap around the cases, isolate for transport multiple layers of cases having same SKU eaches, and/or isolate for transport a single case having the same SKU eaches.

10. The automated decant system of claim 1, wherein the eaches are received at the facility packaged in cases, and the automated decant system further comprises a case stripping machine configured to remove the case packaging materials from each case.

11. The automated decant system of claim 1, the mobile robot being one of a pair of mobile robots comprising totes for receiving eaches, the automated decant system working with the pair of mobile robots simultaneously such that a first mobile robot of the pair positions a tote beneath the load-staging table to receive eaches as a second mobile robot of the pair withdraws a tote from beneath the load-staging table after receiving eaches.

12. The automated decant system of claim 1, the mobile robot being one of a plurality of mobile robots, the automated decant system comprising a pair of lanes below, and to either side of, the load-staging table, wherein a first mobile robot of the plurality of mobile robots in the first lane extends an empty tote inward under the load-staging table to receive eaches as a second mobile robot of the plurality of mobile robots in the second lane withdraws a tote having just received eaches from under the load-staging table.

13. The automated decant system of claim 1, wherein the movable support surface comprises first and second conveyor belts, the first belt supported on a first drive roller and a first driven roller, both configured for rotation and translation, and the second conveyor belt supported on a second drive roller and a second driven roller, both configured for rotation and translation, the first and second driven rollers positioned adjacent to each other for the first and second conveyors to support the eaches at the load-staging table.

14. The automated decant system of claim 13, translation of at least one of the first and second drive rollers creating a gap between the first and second driven rollers through which gap the eaches drop into the tote.

15. The automated system of claim 14, wherein the tote comprises first and second sub-totes, and wherein the eaches fall into the first sub-tote when the gap is created over the first sub-tote, and wherein the eaches fall into the second sub-tote when the gap is created over the second sub-tote.

16. An automated decant system for transferring eaches received at a facility into totes, the automated decant system comprising:
    a load-staging table configured to receive eaches, the load-staging table comprising a support surface configured to support eaches at the load-staging table and drop the eaches to a position beneath the load-staging table;
    a plurality of mobile robots configured to support the totes as the mobile robots move around the facility; and
    a pair of lanes below the load-staging table;
    wherein a first mobile robot of the plurality of mobile robots in the first lane positions a first tote at the position beneath the load-staging table to receive eaches as a second mobile robot of the plurality of mobile robots in the second lane withdraws a second tote having received eaches from the position beneath the load-staging table.

17. The automated decant system recited in claim 16, wherein the eaches are received at the facility packaged in cases on pallets, and the automated decant system further comprises a robotic case de-palletizer module configured to convert pallets of packaged cases to individual, unwrapped cases.

18. The automated decant system of claim 17, wherein the robotic case de-palletizer module is configured to remove shrink wrap around the cases, isolate for transport multiple layers of cases having same SKU eaches, and/or isolate for transport a single case having the same SKU eaches.

19. The automated decant system of claim 16, wherein the eaches are received at the facility packaged in cases, and the automated decant system further comprises a case stripping machine configured to remove the case packaging materials from each case.

20. The automated decant system of claim 16, wherein the pair of lanes are positioned below, and to either side of, the load-staging table, wherein the first mobile robot extends an empty tote inward to the position beneath the load-staging table to receive eaches.

21. The automated decant system of claim 16, further comprising a movable support surface configured to slide laterally or rotate about an axis downward from beneath the eaches at the load-staging table, at which point the eaches drop to the position beneath the load-staging table.

22. The automated decant system of claim 21, wherein the movable support surface comprises first and second conveyor belts, the first belt supported on a first drive roller and a first driven roller, both configured for rotation and translation, and the second conveyor belt supported on a second drive roller and a second driven roller, both configured for rotation and translation, the first and second driven rollers positioned adjacent to each other for the first and second conveyors to support the eaches at the load-staging table.

23. The automated system of claim 16, further comprising one or more dividers configured to separate the eaches into one or more sets of eaches on the load-staging table.

24. The automated system of claim 23, wherein a tote comprises one or more sub-totes, the one or more dividers defining positions of the one or more sets of eaches corresponding to positions of the one or more sub-totes in the tote.

25. An automated decant system for transferring eaches, received at a facility packaged in cases on pallets, into totes, the automated decant system comprising:
    a control system including a processor configured to:
        receive an identifier associated with the cases and/or eaches;
        match the identifier with a stored software recipe customized for the identifier;
        execute the software recipe, identified for the cases and/or eaches, directing the handling of the identified cases and/or eaches;
    an automated case stripping machine, in communication with the control system, configured to remove at least some of the case packaging materials from each case per the executed software recipe; and
    a loading work cell receiving the case per an instruction from the software recipe, the eaches transferred from the case to a tote at the loading work cell per the executed software recipe.

26. The automated decant system of claim 25, wherein the loading work cell comprises a robotic system for transferring the eaches from the case to the tote per the software recipe.

27. The automated decant system of claim 25, wherein the robotic system comprises a machine vision device and a gripper for transferring eaches to the tote organized by SKU.

28. The automated decant system of claim 25, wherein the loading work cell comprises a display for displaying instructions from the software recipe for manual transfer of the eaches from the case to the tote.

29. The automated decant system of claim 25, wherein the software recipe directs the packaging materials to be fully removed at the automated case stripping machine, and the software recipe directs the loading work cell to separate the eaches from the fully stripped cases.

30. The automated decant system of claim 25, wherein the software recipe directs the packaging materials to be partially removed at the automated case stripping machine, and the software recipe directs the loading work cell to separate the eaches from the partially stripped cases.

* * * * *

UNITED STATES PATENT AND TRADEMARK OFFICE
CERTIFICATE OF CORRECTION

| | |
|---|---|
| PATENT NO. | : 11,845,610 B2 |
| APPLICATION NO. | : 17/538466 |
| DATED | : December 19, 2023 |
| INVENTOR(S) | : John G. Lert, Jr. et al. |

It is certified that error appears in the above-identified patent and that said Letters Patent is hereby corrected as shown below:

In the Claims

In Column 14, Claim 7, Line 38, delete "system" and insert --decant system--, therefor.

In Column 15, Claim 14, Line 17, delete "translation" and insert --the translation--, therefor.

In Column 15, Claim 15, Line 21, delete "system" and insert --decant system--, therefor.

Signed and Sealed this
Fourth Day of June, 2024

Katherine Kelly Vidal
*Director of the United States Patent and Trademark Office*